(12) United States Patent
Pai et al.

(10) Patent No.: US 10,339,484 B2
(45) Date of Patent: Jul. 2, 2019

(54) SYSTEM AND METHOD FOR PERFORMING SIGNAL PROCESSING AND DYNAMIC ANALYSIS AND FORECASTING OF RISK OF THIRD PARTIES

(71) Applicant: KPMG LLP, New York, NY (US)

(72) Inventors: Pradeep Pai, New York, NY (US);
Andrea Urban, New York, NY (US);
Lawrence Raff, Verona, NJ (US);
James Schneider, Paramus, NJ (US)

(73) Assignee: KPMG LLP, New York, NY (US)

( * ) Notice: Subject to any disclaimer, the term of this patent is extended or adjusted under 35 U.S.C. 154(b) by 412 days.

(21) Appl. No.: 15/331,243

(22) Filed: Oct. 21, 2016

(65) Prior Publication Data

US 2017/0140312 A1     May 18, 2017

Related U.S. Application Data

(60) Provisional application No. 62/245,793, filed on Oct. 23, 2015.

(51) Int. Cl.
*G06Q 10/06* (2012.01)
*G06Q 10/08* (2012.01)

(52) U.S. Cl.
CPC ..... *G06Q 10/0635* (2013.01); *G06Q 10/0875* (2013.01)

(58) Field of Classification Search
CPC .............. G06Q 10/0635; G06Q 10/0875
USPC ................................................. 705/7.28
See application file for complete search history.

(56) References Cited

U.S. PATENT DOCUMENTS

| | | | | |
|---|---|---|---|---|
| 7,725,565 | B2* | 5/2010 | Li | G06Q 10/067 709/219 |
| 7,783,542 | B2* | 8/2010 | Horowitz | G06Q 40/00 705/35 |
| 9,746,985 | B1* | 8/2017 | Humayun | G06Q 10/10 |
| 2008/0140348 | A1* | 6/2008 | Frank | G06Q 10/06 702/181 |
| 2008/0172352 | A1* | 7/2008 | Friedlander | G06N 7/08 706/46 |
| 2009/0319295 | A1* | 12/2009 | Kass-Hout | G06Q 10/1095 705/2 |
| 2010/0324945 | A1* | 12/2010 | Hessing | G06Q 40/06 705/4 |
| 2011/0238566 | A1* | 9/2011 | Santos | G06Q 40/025 705/38 |
| 2012/0095802 | A1* | 4/2012 | Wilberding | G06Q 10/063 705/7.28 |

(Continued)

*Primary Examiner* — Dylan C White
(74) *Attorney, Agent, or Firm* — Dentons US LLP

(57) ABSTRACT

A system and process for forecasting third party disruption that uses a complex computerized network map as part of a risk model may be used to analyze risk for third parties. A number of risk factors or nodes of the map may include a wide range of risks (e.g., corruption) that have an impact on third parties in a geographic region. A baseline risk level may be established by scoring underlying risk measures for respective geographic regions. By executing the risk model using dynamic signal processing in a near real-time manner and considering impact, velocity, likelihood, and interconnectedness of risk factors and the diffusion of risk across a network, potential third party disruption and/or vulnerability can be forecasted.

19 Claims, 17 Drawing Sheets

(56) References Cited

U.S. PATENT DOCUMENTS

| | | | |
|---|---|---|---|
| 2014/0137257 A1* | 5/2014 | Martinez | H04L 63/1433 726/25 |
| 2014/0180755 A1* | 6/2014 | Prieto | G06Q 50/08 705/7.28 |
| 2014/0278708 A1* | 9/2014 | Byk | G06Q 10/06315 705/7.25 |
| 2015/0025917 A1* | 1/2015 | Stempora | G06Q 40/08 705/4 |
| 2015/0161738 A1* | 6/2015 | Stempora | G06Q 40/08 705/4 |
| 2015/0269347 A1* | 9/2015 | Bhatt | G06Q 50/22 705/2 |
| 2018/0048668 A1* | 2/2018 | Gupta | H04L 63/1425 |

* cited by examiner

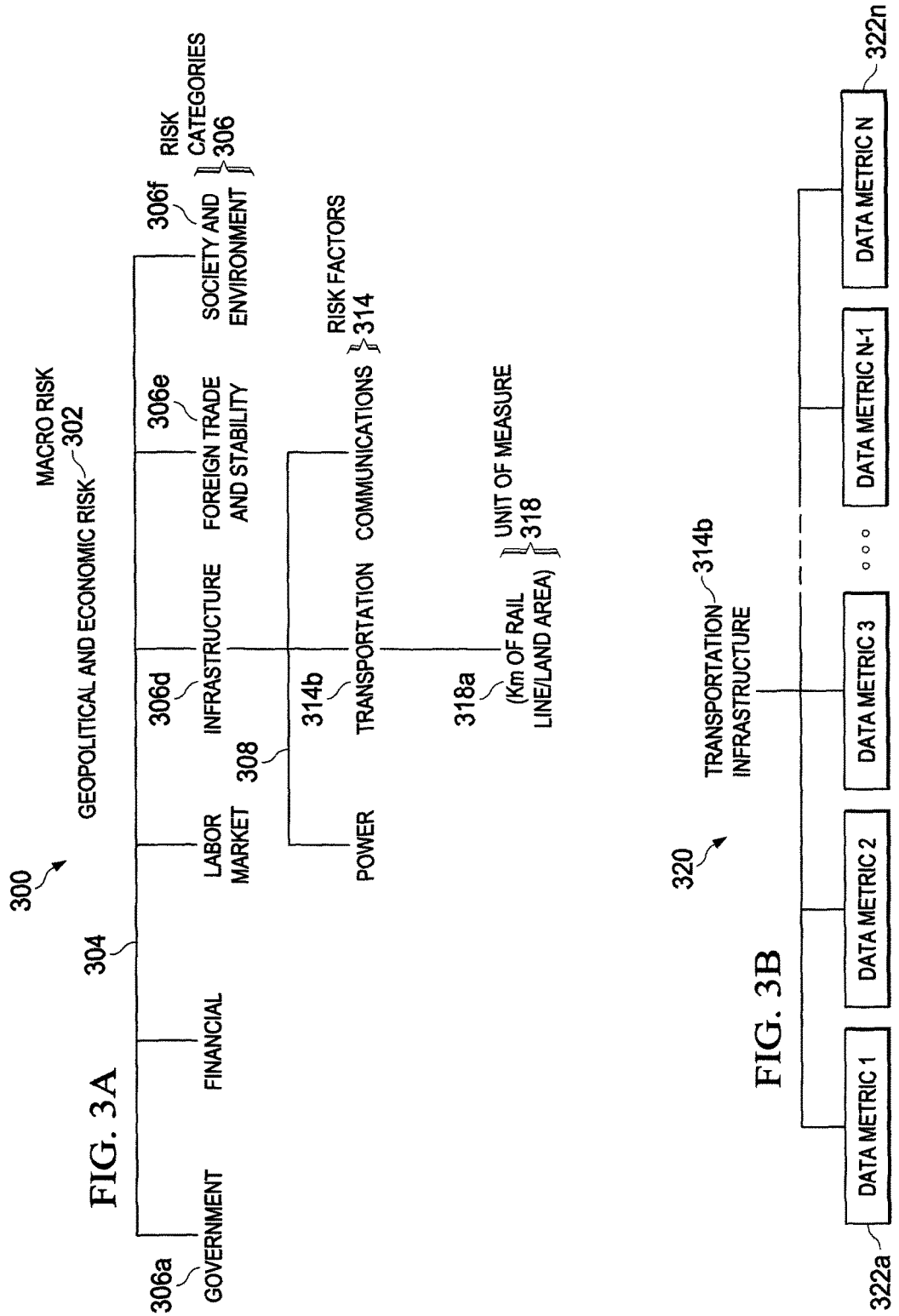

SYSTEM AND METHOD FOR PERFORMING SIGNAL PROCESSING AND DYNAMIC ANALYSIS AND FORECASTING OF RISK OF THIRD PARTIES

RELATED APPLICATIONS

This Application claims priority to U.S. Provisional Patent Application having Ser. No. 62/245,793, filed Oct. 23, 2015; the contents of which are hereby incorporated by reference in their entirety.

BACKGROUND

Globalization is driving unprecedented levels of scale, agility, and execution of organizations, such as manufacturing, financial services, and others increasing their potential exposure to a disruption at one of their third parties (e.g., suppliers, vendors, partners, etc.) including possibly within their global supply chain. Exposure to disruption highlights the need for enhanced methodologies for global supply chain management, business partnerships, or any other third party risk management, and risk management overall. Retroactive analysis techniques have historically been used to provide sufficient methodologies for organizations to make adjustments to procurement and other third party relationships to support going-forward operations and to deliver products and services. However, the ability to manage operations using retroactive analysis techniques is less effective given the global nature and speed of business. Capital markets and private owners alike now expect significantly increased levels of forecasting, scale, consistency, precision, and speed. The performance expectations range from financial to operational.

Performance is driven by a constant stream of actionable decisions. Those decisions are made through a) human intervention, b) machines, or c) a combination thereof. The decisions rely on available data, structured and unstructured. For example, organizations, such as automobile companies, are sourcing thousands of goods from suppliers and service providers across the globe to produce products. Often, these goods are being delivered via fragile transportation networks on a "just-in-time" basis. As a result, the risk of a supplier or other third parties being unable to produce and deliver the goods on a timely basis is increased, and the actual inability for a producer to produce and deliver goods may cause significant production problems for the end-producer. Similarly, other types of organizations, such as financial services firms, for example, face significant risks from their third parties as organizations increasingly rely on outside entities (e.g., third-party vendors) for operations. The resources in charge of identifying risks to suppliers (e.g., risk managers) must identify risks that stem from a combination of factors within their control (e.g., financial, operational) and outside of their control (e.g., geopolitical events, economic conditions, severe weather, compromised infrastructure, etc.), and make a necessary set of related decisions to maintain expected production levels.

Risk managers must also identify risks to third parties that stem from factors outside their control. As an example, shortages of raw materials (e.g., silicone, rubber, rare earth metals, etc.) for a producer of components that are used in a final product could cause significant production problems for a manufacturer of the final product. As another example, geopolitical risks, such as regional violence, strikes, or other geopolitical situations can cause suppliers or vendors in the region to have production or distribution problems. Still yet, weather situations, such as hurricanes and typhoons, droughts, snow storms, and other weather situations can cause third party disruptions. Infrastructure problems, be it related to transportation or communication or power, within a geographic region can also cause risk to third parties of a user (e.g., manufacturer or general contractor) as third parties may experience potential problems related to the movement of goods or people. For example, a breakdown in the communications infrastructure of a geographic region may in fact have severe implications for a financial services firm with third parties operating in the region.

As a result of the potential fragility of third parties, such as suppliers in global supply chains, and the increased risk associated with them due to numerous factors including just-in-time inventories and scale, risk managers and other users need a solution to holistically monitor and forecast discrete and macro risk that is able to view third party financial and performance risk in the broader context of the geopolitical factors that can potentially disrupt the movement of critical goods and services.

Conventional techniques for performing forecasting have shortcomings due to information analysis techniques and technologies. Many organizations monitor events, such as news stories and other sources, without any additional context or analysis. For example, the organizations may be alerted to a weather event, an accident or criminal act in a geographic region. But, this type of information alert is actually detrimental, as over time, organizations become desensitized to alerts and the alerts become "noise," especially since further contextual analysis may be needed in response to those alerts. Hence, an improved signal processing and risk analytic solution that filters signals from noise provides insights and information being processed to yield results for organizations to forecast risk from the dynamically filtered signals is needed. This enables organizations to see a more complete picture of the risks to which they are exposed, including those interconnected risks to which the organizations may now be more susceptible.

SUMMARY

To provide a risk manager and others within an organization with a solution that can serve to improve forecasting of risk of third parties (e.g., suppliers of a supply chain), a system and process for forecasting third party disruption that uses a complex computerized network map as part of a risk model that may be used to analyze risk for third parties may be utilized. In one embodiment, risk assessment may be made by determining (i) that at least two risk factors (leaves of a risk tree being the nodes of the network map) are correlated and (ii) that risk score levels indicative of a situation that is forecasted to cause a potential supply chain disruption for third parties located in a geographic region are reached. A number of risk factors or nodes of the network map may include a wide range of risks (e.g., corruption, transportation infrastructure, energy security) that have an impact on third parties in a geographic region (e.g., country), which may lead to a potential disruption. The network map representing a component of a risk model, which may be the same or different for each of the geographic regions or different industries, may be used.

A baseline risk level may be established by scoring underlying risk measures or data metrics for respective geographic regions. A computerized network map and signal processing of information may be used to analyze risk and determine when risk factors are to be activated and third parties operating in those geographic regions have heightened risk. In other words, the system determines and forecasts when the risk level in a geographic region is high. By executing the risk model using dynamic signal processing (e.g., performing signal processing on data signals in the form of news stories or other content) and considering impact, velocity, likelihood, and interconnectedness of risk factors in a near real-time manner, potential third party disruption and/or vulnerability can be determined and/or forecasted, thereby allowing a user that relies on those third parties to potentially avoid disruption of production or other operations. Because risk factors impact other risk factors, the computerized network map may provide for diffusion of risk to other risk factors from a risk factor that is determined to be impacted by determining a fixed-frequency, amplitude-modulated signal strength using signal processing on content and metadata associated with that content in a geographic region. The diffusion of risk may be determined using the Leontief Input-Output Model, for example.

One embodiment of a computer-implemented method may include generating a computerized network map being inclusive of a plurality of nodes representative of risk factors in multiple geographic regions in which one or more third parties of a user operate. Each of the nodes in the network map may (i) be interconnected with at least one of the other nodes as correlated risks and (ii) include a risk factor value calculated as a function of at least one risk measure used to model the respective risk factor. A baseline risk of a geographic region may be computed by: (i) collecting data metrics for each risk factor of the geographic region; (ii) processing the data metrics to generate normalized data for each risk factor; (iii) aggregating the normalized data metrics of each risk factor to generate risk factor scores; and (iv) computing a baseline risk score for the geographic region by aggregating the risk factor scores. Dynamic signal processing may be performed for each risk factor in a geographic region on associated content, including news and event content, and metadata associated with the content by: (i) utilizing a taxonomy describing disruption events associated with each of the risk factors of the network map and a taxonomy describing a geographic region being monitored in which the one or more third parties operate; (ii) measuring signal strength of the identified content based on the metadata associated with the content; (iii) measuring signal strength associated with a risk factor for the geographic region for a fixed period of time based on the signal strength of the identified content associated with that risk factor, thereby forming a time series of the measured signal strengths; (iv) performing sequential analysis on the time series of the measured signal strengths of a risk factor for a geographic region using the variance of the historical distribution of signal strength for the risk factor for step detection; (v) step detecting to generate a risk signal for the risk factor within the geographic region based on a value of the calculated sequential analysis exceeding a threshold value determined by the variance of an historical distribution of the signal strength of the risk factor; and (vi) activating the risk factor for a geographic region in response to the risk signal being generated. Risk in the geographic region in which the risk factor was activated in response to the risk signal being generated may be forecasted by: (i) calculating diffusion of risk throughout the network map so as to measure impact on correlated risks across the network map; (ii) computing the projection of risk impact for each risk factor within the network map; (iii) computing the probability projection for each risk factor within the network map; and (iv) generating a risk projection for a geographic region based on the individual risk factor projections. A vulnerability score may be forecasted for each third party operating in an industry affected by the active risk factor by: (i) categorizing third parties by industry and mapping the industries to the risk factors by degree of sensitivity; (ii) determining the extent to which third parties are affected by the activation of the risk factor in response to the risk factor having been activated based on the industry categorization of the third party; (iii) calculating a vulnerability score projection for the affected third party based on a financial risk score of the third party, the active geographic risk factors of the region in which the third party operates that affect the third party as well as the review status/times since last review of the third party; and (iv) generating a dynamic graphical user interface for the forecasted risk for the risk factors and the forecasted vulnerability scores for third parties within the geographic region.

BRIEF DESCRIPTION OF THE DRAWINGS

Illustrative embodiments of the present invention are described in detail below with reference to the attached drawing figures, which are incorporated by reference herein and wherein:

FIG. 3A is a block diagram of an illustrative risk tree that is established for a certain risk, such as geopolitical risk, and includes a main branch on which risk categories are positioned;

FIG. 3B is a block diagram of an illustrative sub-tree structure of an illustrative risk factor, in this case transportation infrastructure risk factor, is shown to include a number of data measures for use in assessing the risk factor;

DETAILED DESCRIPTION OF THE DRAWINGS

Figure 1:
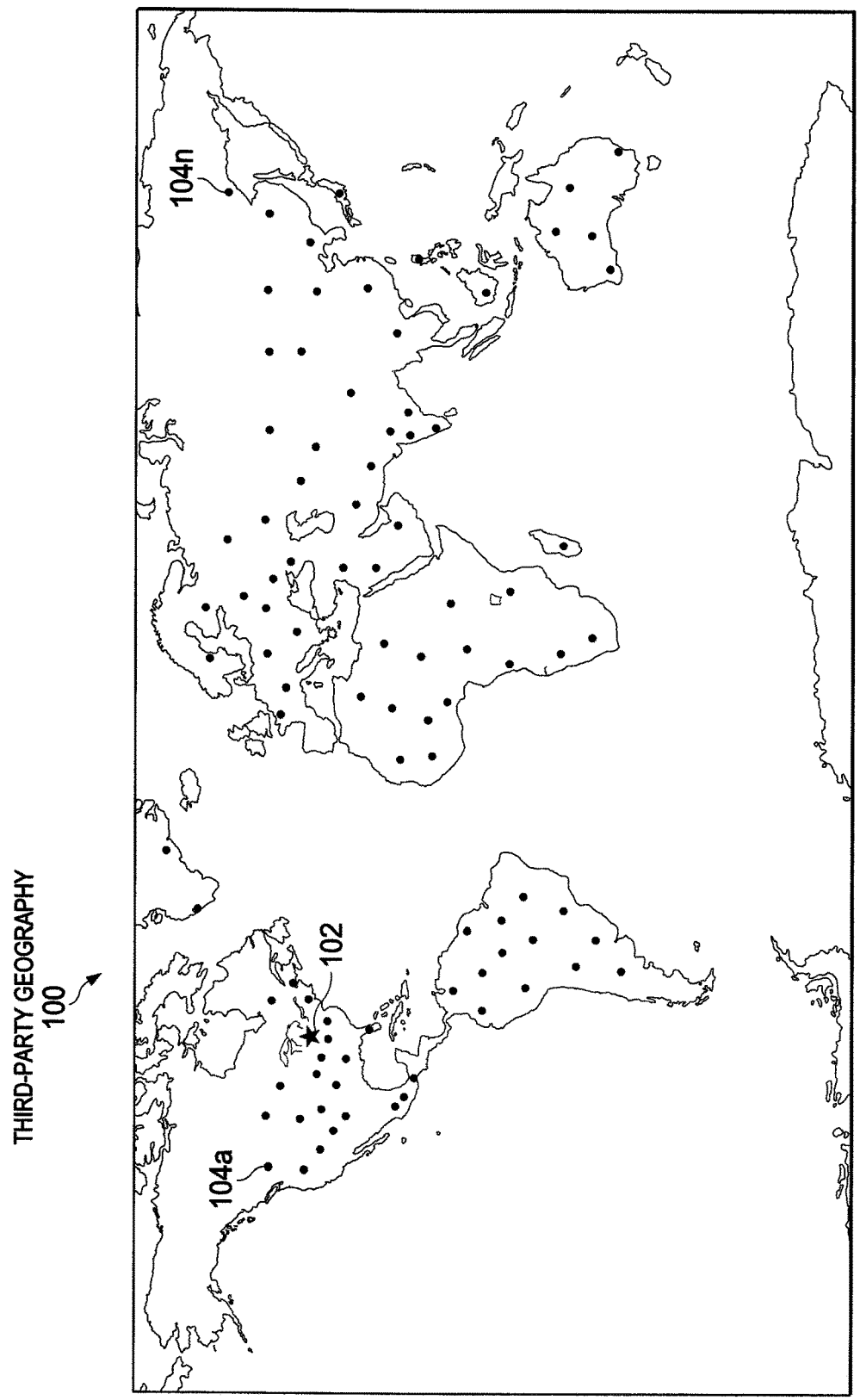
FIG. 1 is an illustration of an illustrative world map showing a manufacturer or service provider with global locations of various third parties (e.g., suppliers) dispersed.

With regard to FIG. 1, an illustration of an illustrative world map 100 showing a manufacturer or service provider 102 having third parties 104a-104n (collectively 104) dispersed throughout various countries around the globe is shown. The third parties may be suppliers, distributors, consultants, or any other support group or individual, including, but not limited to, members of an organization in a different geographic region. As shown, there are many third parties located in many geographic regions. Such a numerous third party situation is often found in production of complex consumer products, such as automobiles, computers, and other products or services in which many different materials, parts, and labor are used to form an end-product. In one embodiment, geographic regions may be defined as countries. In another embodiment, geographic regions may be defined as more localized regions than a country, such as province, state, county, or geopolitical (e.g., zip code) region.

As understood in the art of modeling, a model, such as a risk model, is only as valid as the parameters and equations used to define the model. For a risk model used to model risks associated with third parties (e.g., suppliers within a supply chain) within certain geographic regions, a computerized risk network map may use risk factors for each node of the risk network map, and be used to analyze risk of third parties operating in geographic regions. The risk network map may be established for global modeling of risk of third parties and/or specifically defined for a geographic region and situation of third parties in that geographic region.

Figure 2A:
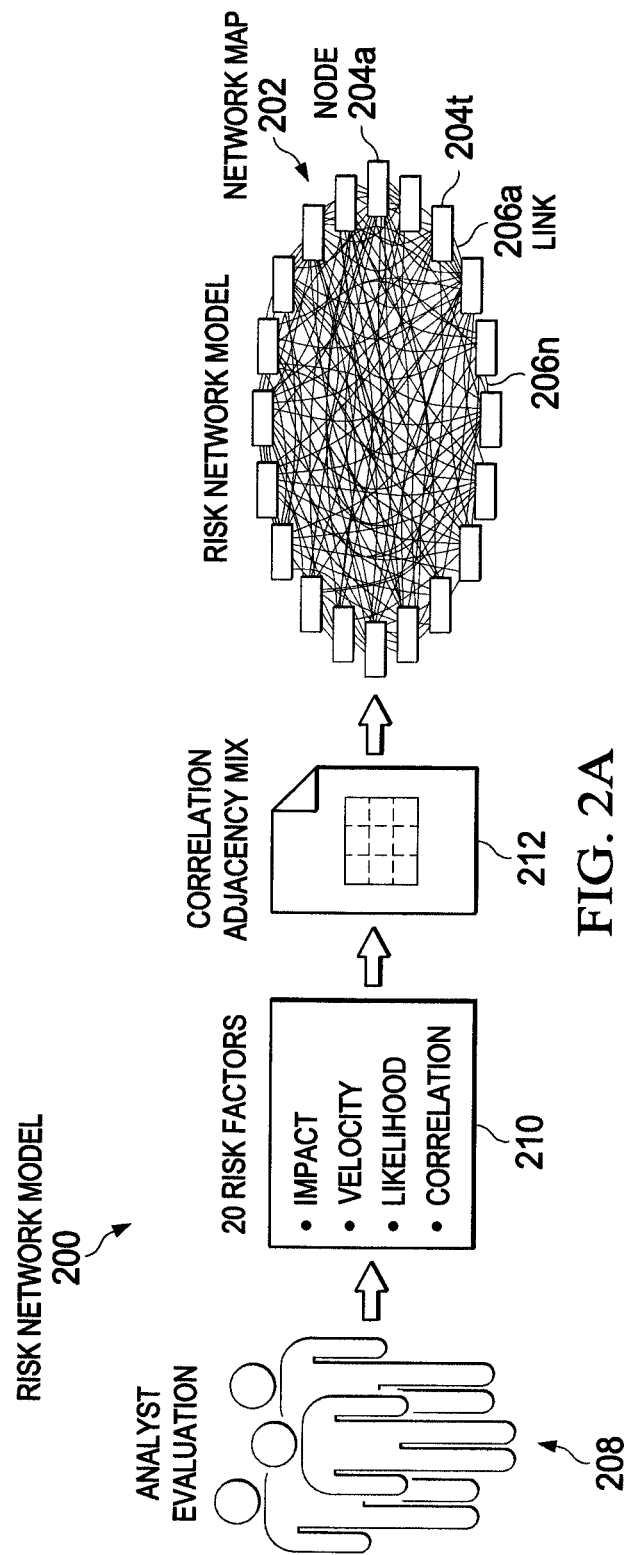
FIG. 2A is a flow diagram of an illustrative process for generating a risk network model embodied as a computerized network map that may be used to analyze risk in each geographic region being monitored for third parties of a user.

With regard to FIG. 2A, a flow diagram of an illustrative process 200 for generating a risk network model embodied as a computerized network map 202 that may be used to analyze risk of each geographic region being monitored for third parties of a user is shown. It should be understood that the user may be an organization or member thereof that relies on third parties for goods or services. The computerized network map 202 may be represented by a processing unit by utilizing a customized data class structure or other technique for managing large, dynamic datasets for computer modeling and data management. These third parties may produce goods or provide services to the user or to the user's end customers. The network map 202 may be configured within memory of a computer, and includes nodes or vertices 204a-204t (collectively 204) that are risk factors that are generally associated with risks of third parties within geographic regions, such as countries. The nodes 204 are interconnected by links or edges 206a-206n (collectively 206), as further described herein. In one embodiment, the risk factors, pictured as nodes in the network map, may be organized into risk categories. As an example, geopolitical & economic risk categories may be organized within six macro risk categories, including those related to (i) government, (ii) financial, (iii) labor market, (iv) infrastructure, (v) foreign trade and stability, and (vi) society and environment. As an example, the infrastructure risk category may have three risk factors within the network map 202, including power, transportation, and communications. These three risk factors would be three of the nodes or vertices 204 of the network map 202. The other risk categories have risk factors that are also nodes 204 of the network map 202. It is contemplated that additional or fewer macro risk categories may be utilized, as well. Each risk factor may be defined such that risk measures or data metrics that meet the risk factor definitions may be applied. For example, for the weak rule of law risk factor within the government risk category, the definition may include the risk of "weak protection and/or enforcement of property and contract rights, the lack of an impartial legal system, judicial process or courts being subject to interference and distortion, and unreliable police services and/or violent crime."

With regard to FIG. 3A, a block diagram of an illustrative risk tree 300 that is established for a certain macro risk 302, geopolitical risk, and includes a main branch 304 on which risk categories 306a-306f (collectively 306) of the macro risk 302 are positioned is shown. Sub-branch 308 is made up of risk factors 314. The risk factors 314 are scored using the units of measure or data metrics 318 associated with each risk factor 314.

TABLE I is an illustration of how the Fragility of Transportation Infrastructure risk factor 314b is a branch of the infrastructure risk category 306d. Kilometers of Rail Lines/Land Area unit of measure for a geographic region 318a may be used as one data input to assess transportation infrastructure for a geographic region. It should be understood that other data metrics and units of measure that impact risk factors or statistical measure(s) of a geographic region may be used.

TABLE I

| Hierarchical Risk Tree | |
| --- | --- |
| Tree Level | Example |
| RISK | Geopolitical Risk |
| RISK CATEGORY | Infrastructure Risk |
| RISK FACTOR | Fragility of Transportation Infrastructure Risk |
| UNIT OF MEASURE or DATA METRIC | Kilometers of Rail Lines per Land Area |

More specifically, countries with weak data metrics for a particular risk factor will have risk factor scores reflecting greater risk. Data metrics and the scores calculated there from provide risk analysts with a level of understanding of the level of risk in any given country or other geographic region. Objective measures of risk may be derived by aggregating risk measures from multiple authoritative and statistics-based rating organizations. Some such organizations may include, but are not limited to, the U.S. State Department, World Bank, and so forth. A total risk baseline score for a geographic region may be calculated based on scores for all risk factors on a risk tree. A partial risk baseline score for a geographic region may be calculated based on scores for a portion of risk factors on a risk tree.

Risk Indexing Methodology

With regard to FIG. 3B, a block diagram of an illustrative sub-tree structure 320 of an illustrative risk factor, in this case transportation infrastructure risk factor 314b, is shown to include a number of generic data metrics or units of risk measure 322a-322n (collectively 322). These risk measures 322 may be used to quantitatively measure the risk factor 314b. For example, to profile transportation infrastructure in a specific country, a robust set of risk measures 322 possibly including such measures as quality, passenger traffic, freight traffic, density, and lengths of various segments of the transportation infrastructure having the same or different units of measure may be analyzed for that given country. It should be understood that different risk factors have different units of measure or data metrics and different numbers of such underlying metrics.

Using the various data metrics 322 having varying units, a sigmoid function based logistic regression analysis may be used. The sigmoid distribution is used to derive a scaled score between 0-100 for each data metric that may be averaged up to derive a scaled score for the risk factor and then weight-averaged to derive a score for the baseline risk score for the country or geographic region. In one embodiment, a scale, such as 0-100, where 0 represents lowest risk and 100 represents highest risk, may be used so that a comparison may be made. Calculations may be made to effectively handle missing data metric values as well as non-normal distributions or extreme ranges, as further described with regard to FIG. 5.

Referring again to FIG. 2A, the process 200 is shown to include analysts or respondents 208 who may be provided with a survey of model inputs or attributes 210. In one embodiment, the model inputs 210 may include (i) risk impact, (ii) risk probability or likelihood, (iii) risk velocity, and (iv) correlation or interconnectedness of the risk factors. The model inputs 210 may be considered risk factor characteristics.

Risk Velocity: By layering on an estimate of risk velocity, risk professionals are better able to manage risks, such as in this one use case, supply chain risk. For example, even if a risk is highly likely and expected to have a high impact, it may not warrant an excessive amount of planning if it is also expected to take nine months or more for the risk to unfold or for an impact to be felt. Conversely, a high-velocity event may warrant a greater degree of preparation even if the likelihood of high-velocity event is materially less as managers will have a smaller window of time in which to react before a material impact is felt.

Interconnectedness: Interconnectedness of different risks may also be utilized in the risk model. Network mapping may reveal how risks that were previously believed to be low level in nature may be highly interconnected, and, thus, meriting greater attention. The network map may illustrate the correlations of different risk factors or the interconnections of risk throughout the network.

Categories of Third Parties: Different industries have different sensitivities to the different risk factors in that different industries are materially affected by different risks. The categorization of third parties by industry and determining the different sensitivities of those industries to different risk factors may enhance risk analysis and ultimately support management capability on greater understanding and awareness of risks. As an example, presumably a call center may be greater affected by a breakdown in communications infrastructure than a mining company would be. Moreover, the categories provide for enhancing and focusing treatment of like entities in applicable data sets.

Surveys of or input from subject matter experts may be used to help assess risk. In one embodiment, the subject matter experts or other respondents may be asked for their input in assessing characteristics of the risk factors, including impact, likelihood, velocity and interconnectedness. TABLE II provides representative examples of questions and scales for each question of the survey. The scales may be applied to each risk factor so that a quantitative result for each risk factor can be produced by a system and used in the model.

TABLE II

Risk Model Input Survey

| Model Input/ Attribute | Question | Scale |
|---|---|---|
| Risk Impact | What do you expect would be the severity of each of the risks? | 1-5, Very low to Very high. |
| Risk Probability | What is the likelihood that the following risk will occur over the next year in the jurisdictions in which your third parties operate? | 1-5, Very low to Very high |
| Risk Velocity | What do you rate the velocity of each risk to be-i.e., if each of these risks occurs, then how long would it take to materially impact your third party operators or supply chain? | 1 = less than a month, 4 = over 9 months. |
| Interconnectedness | For each risk factor, assuming that risk occurred, please select the most pertinent risks that would be made more likely to occur or potentially worse in consequence? Select up to 3 risks. If there are no pertinent risks, please select "No Related Risks" | |

The last model input of interconnectedness provided in TABLE II may be used to provide risk correlation and/or clustering of risks so that the risk model accounts for real-world risk interaction. As such, if a particular risk occurs, the interconnectedness responses reveal what other risks respondents expect to be more likely to occur or potentially worse in consequence as a result. If for example respondents are told a military conflict has broken out, they are then asked to choose what if any other risks would be more likely to occur or worse in consequence as a result. In response, a respondent may choose up to three other risk factors, such as for example transportation infrastructure, labor shortage, social unrest, etc. It should be understood that the questions and scales presented in TABLE II are illustrative, and that additional and/or alternative questions and scales may be utilized. It should further be understood that rather than providing a simplified question and answer format, that a graphical user interface may provide for regional selections of answers (e.g., quadrant layout with risk/likelihood axes that allows for a user to touch a quadrant and/or specific locations within a quadrant so as to provide answers for both metrics simultaneously). It should be understood that a variety of different user interfaces may be utilized to capture answers to one or more risk questions.

The answers to the aforementioned interconnectedness question(s) may be used to build an adjacency matrix 212. These answers may be used to define the relationships of the nodes 204 of the network map 202 illustrating their interconnectedness with the links 206a-206n (collectively 206) defined. As an example, these responses may also determine the strength of the connections between risk factors or nodes. In one embodiment, the nodes or vertices are the risk factors and the edges are the connections between them. These responses may be applied to form the computerized network map 202. The interconnectedness enables the risk model to provide for how one risk can be affected by another. As shown on the network map 202, hundreds of connections may be created between the various risk factors, and may be implemented utilizing a computer to store and manage the nodes 204 and links 206 between the nodes 204 of the network map 202.

Figure 2B:
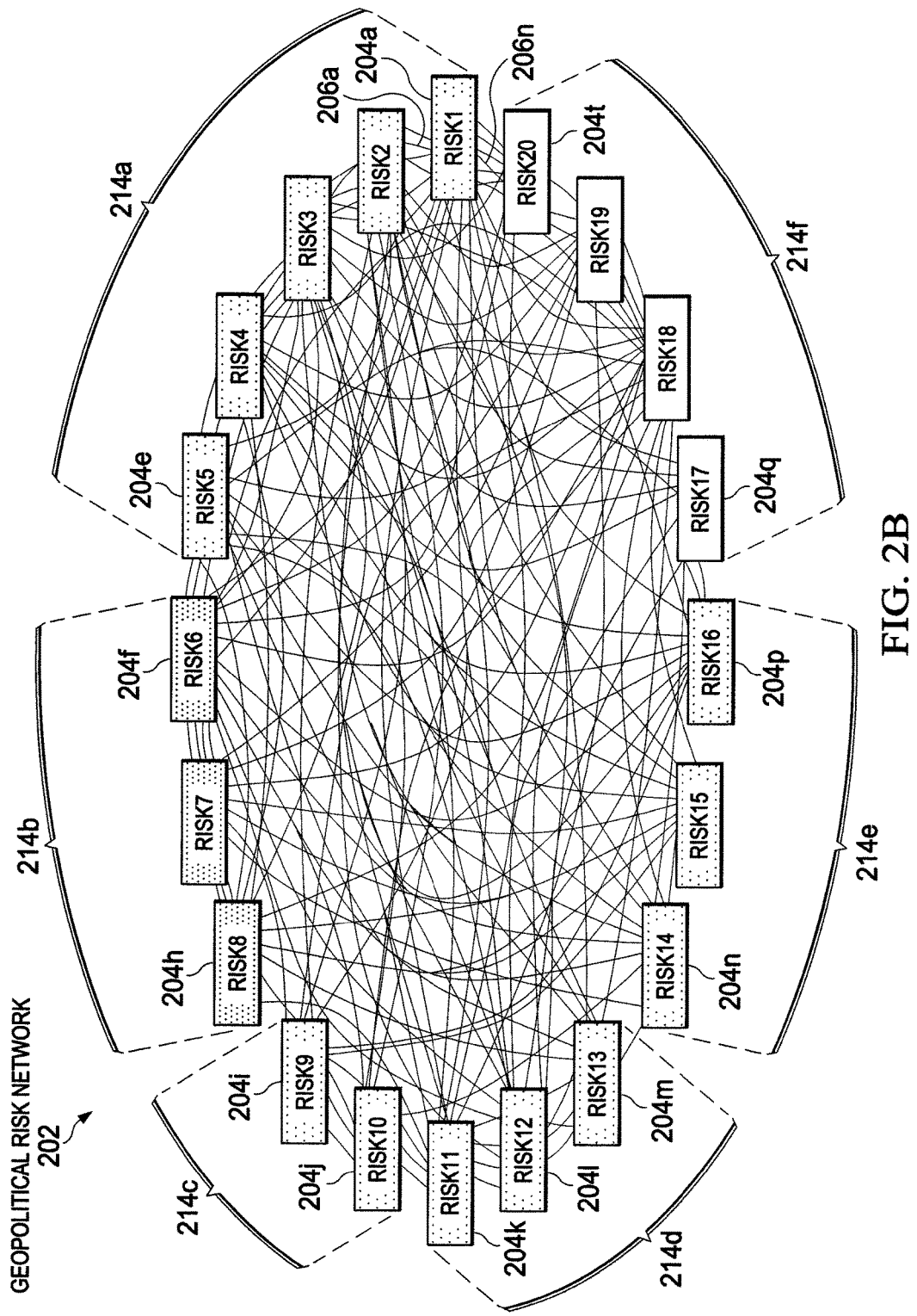
FIG. 2B is an illustration of the network map of FIG. 2A showing the complexity of interconnections between a set of nodes of the network map that are risk factors in the geographic regions for the third parties.

With regard to FIG. 2B, an illustration of the network map 202 of FIG. 2A showing the complexity of interconnections between a set of nodes 204 that represent risk factors of the risk model is shown. The nodes 204 are shown to be associated with risk categories 214a-214f (collectively 214), where sets of nodes (204a-204e), (204f-204h), (204i-204j), (204k-204m), (204n-204p), and (204q-204t) are associated with respective risk categories 214a-214f. Again, the complexity of the links 206 that form interconnections between the nodes of the computerized network map 202 may involve numerous connections in which a risk map is utilized to analyze risk for the third parties. It is understood that the general risk network map may be further specified by geographic region (e.g., US or non-US, or by individual country) or industry. It should be further understood that one or more network maps may be utilized for one or more geographic regions.

Figure 4:
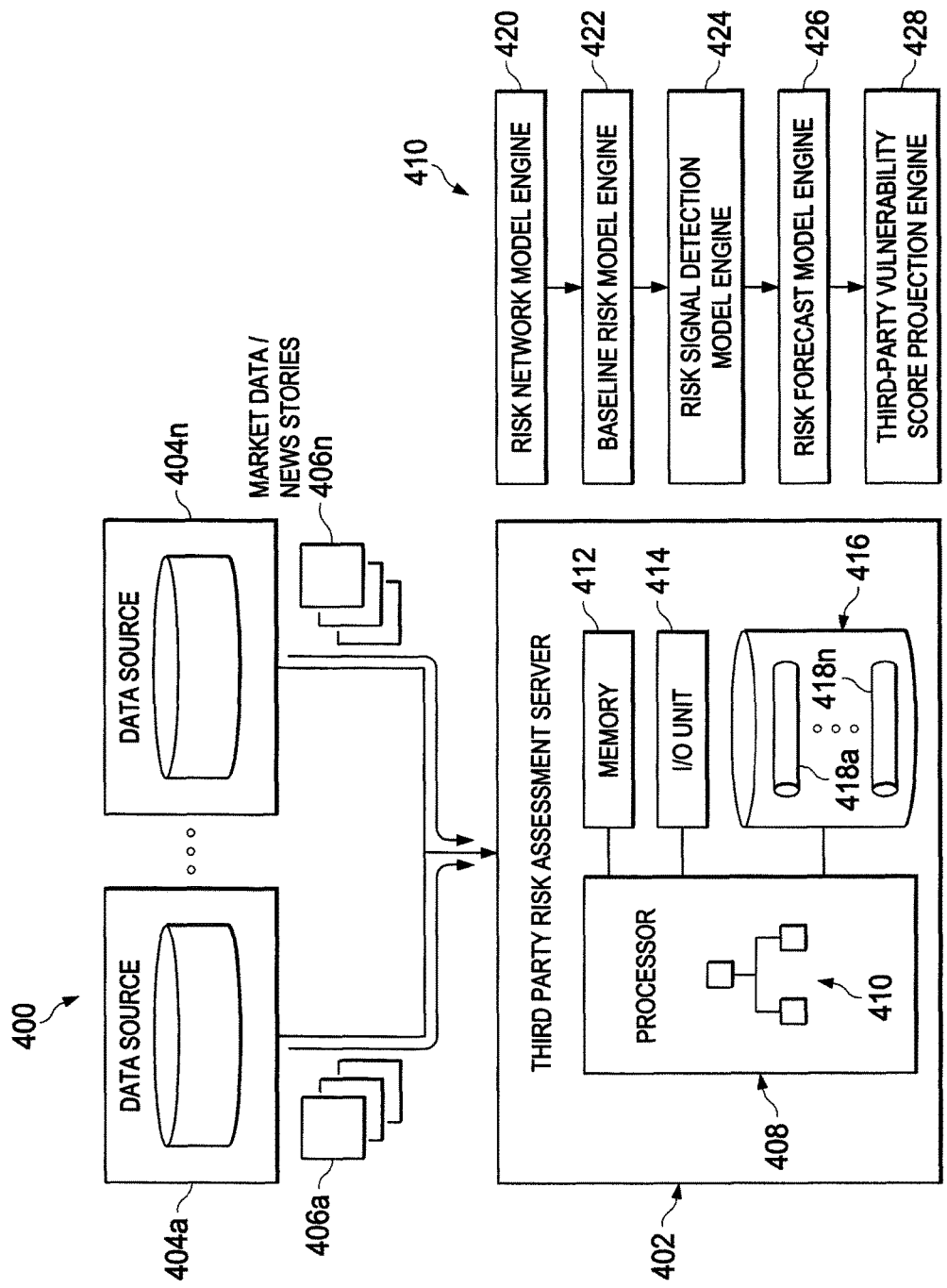
FIG. 4 is a diagram of the solution showing multiple engines that operate as models in an overall risk model.

As further shown in FIG. 4, an illustration of illustrative network environment 400 in which a third party risk assessment server 402 is in communication with disparate data sources 404a-404n (collectively 404) over a communications network, and collects data 406a-406n (collectively 406) inclusive of market data and/or news feeds for use in generating a risk assessment analysis to a user risk associated with third parties is shown. In one embodiment, the data sources 404 may be financial data collection sources, news sources, governmental information sources, statistics sources, or other data sources from which information associated with geographic regions, industries, and/or suppliers from which information related to risk factors may be obtained. The data 406 may be collected using either push or pull data communications protocols, as understood in the art. The server 402 may operate to provide for distributed processing across multiple processing cores concurrently, such that the processes (e.g., modeling and tracking risk factors) described herein may operate in a highly dynamic manner.

The third party risk assessment server 402 may include a processing unit 408 that includes one or more computer processors that execute software 410. The software 410 may be utilized to generate computerized network maps, generate baseline risk of geographic regions, monitor dynamic risk of the geographic regions, perform signal processing, and produce reports and optionally one or more notifications or alerts resulting from the change in dynamic risk as compared to the baseline risk, as further described herein. The processor 408 may be in communication with a memory 412, input/output (I/O) unit 414, and storage unit 416 configured to store one or more data repositories 418a-418n (collectively 418). The data repositories 418 may be configured to store collected data 406 and generated data produced by the software 410 in processing the data 406. As configured, the processor 408 may be specialized to provide for risk assessments, vulnerability scoring, or both of suppliers in one or more geographic regions using forecasting modeling, as further described herein.

In one embodiment, the software 410 includes, but is not limited to, multiple engines that operate as models in an overall risk model that provides for risk of third parties. The engines may include a risk network model engine 420 (see FIG. 2A), baseline risk model engine 422 (see FIG. 5), risk signal detection model engine 424 (see FIG. 6), risk projection model engine 426 (see FIG. 7), and third party vulnerability score forecast engine 428 (see FIG. 8). Each of these models/engines 420-428 provide for certain aspects of the overall risk model to assess risk of third parties of a user, such as an automobile manufacturer, as further described herein. In operation, a process uses the engines 420-428 shown. The risk signal detection model engine dynamically monitors over 2 million information and data sources, including news and other content sources, for information that may affect risk factors in one or more geographic region. Although not shown, information from the risk network model engine 420 and baseline risk model engine 422 may be fed into the risk projection model engine 426 and supplier vulnerability score projection engine 428, as further described herein with respect to FIGS. 7 and 8.

Baseline Risk Indexing

Figure 5A:
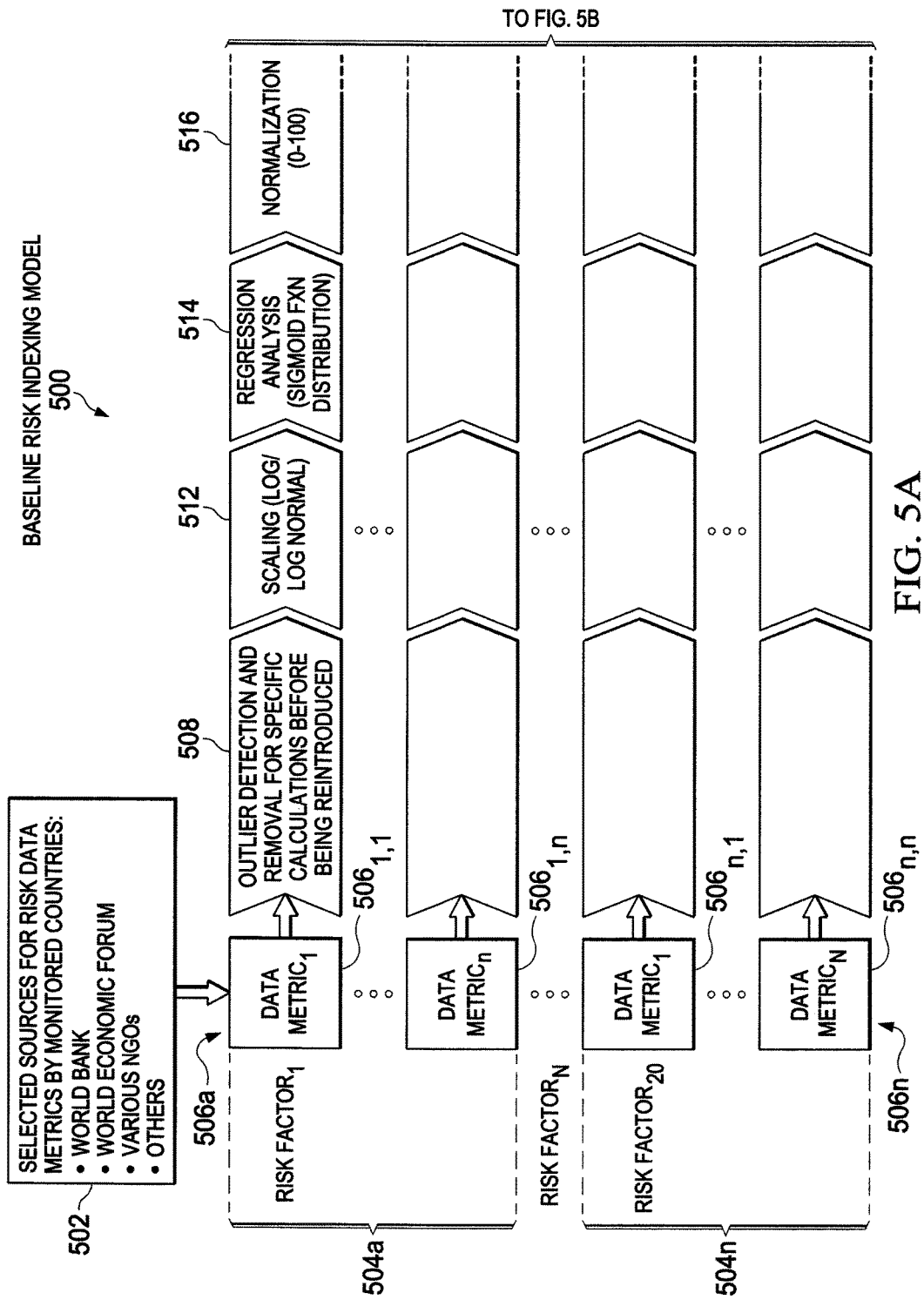
FIGS. 5A-5B (collectively FIG. 5) is a flow diagram of an illustrative process of a baseline risk indexing model for generating a baseline risk index or score.
Figure 5B:
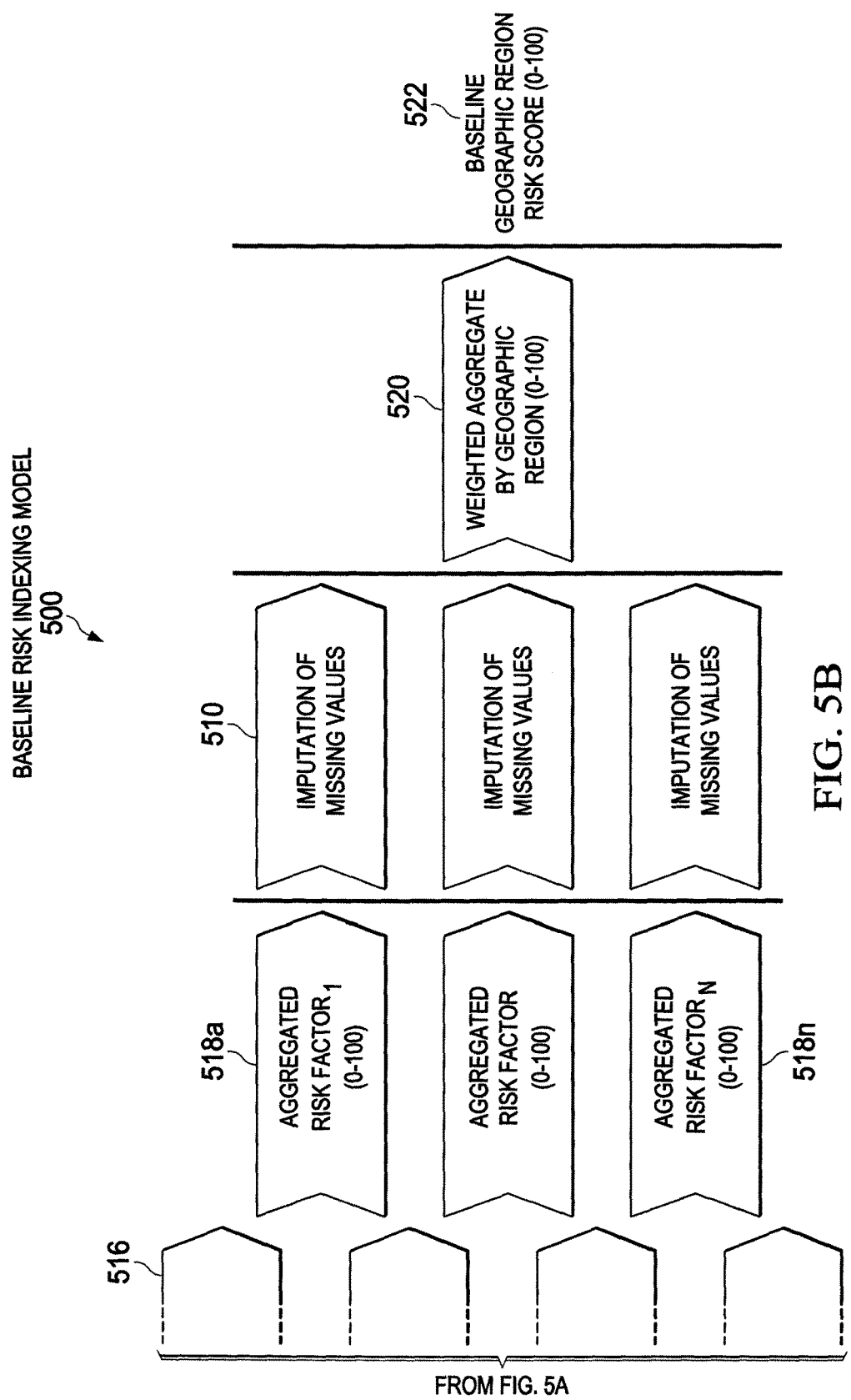

With regard to FIG. 5, a flow diagram of an illustrative process 500 for generating a baseline risk indexing model used in generating a risk assessment analysis is shown. The baseline risk indexing model may be used to quantitatively describe or model risk of a geographic region. The baseline risk indexing allows for users to assess the macro risk affecting the environment in which the third party operates. Moreover, and as understood in the art, the risk is historical in nature because the data used for determining the risk is historical data, such as data from last quarter, last year, etc. For example, for a risk factor such as transportation, the inherent risk of a geographic region may indicate strength of the transportation system, which may include rail, road, air travel, etc. As is provided below, a baseline risk of each geographic region may be scored between 0 and 100, where a low value may be indicative of low risk and a high value may be indicative of high risk. Alternative scoring values may be utilized.

Figure 3C:
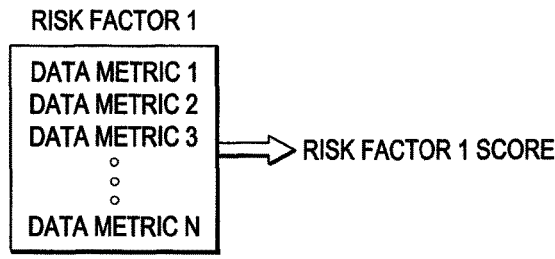
FIG. 3C is a block diagram of an illustrative process for determining a risk factor score, as further provided in FIG. 5.
Figure 3D:
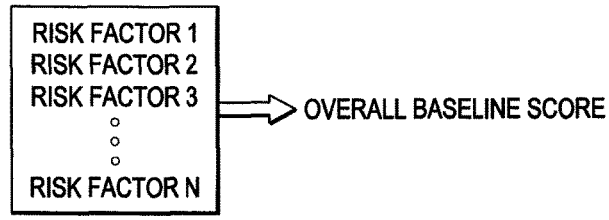
FIG. 3D is a block diagram of an illustrative process for determining an overall baseline score within a geographic region, as further provided in FIG. 5.

The process 500 starts at step 502, where data sources for risk data metrics of geographic regions are selected. The data sources may include the World Bank, World Economic Forum, various non-governmental organizations (NGOs), and other data sources that can provide risk data metrics. At step 502, data metrics may be collected in one or more data repositories, and include units of measures that relate to the risk factors. In collecting the data metrics, collection may be performed in any manner, such as querying databases. These underlying data metrics may be used for determining risk factor scores and an overall baseline score, as shown in FIGS. 3C and 3D, for each geographic region. The collection of the risk data metrics may be performed for each geographic region of interest to determine a baseline risk for each geographic regions. As shown, risk factors $504a$-$504n$ (collectively 504) are shown to include respective data metrics $506_{1\text{-}N}$-$506_{N\text{-}N}$ (respectively and collectively $506a$-$506n$, and collectively 506).

At step 508, an outlier detection process may be performed for each of the risk factors 504 to detect outlier values and to remove the outlier values of the data metrics $506_{1\text{-}N}$ before calculating values for the mean and standard deviation of the data set. After the mean and standard deviation values are calculated, the outlier values are reintroduced to the data set The outlier values may be high and low values of each data metric type (e.g., estimate of miles of roadways) or values that are outside of a statistical range (e.g., n number of standard deviations), for example. At step 512, scaling of the data metric values may be performed. In one embodiment, the scaling may be performed to improve linearity of data metric values. For example, a log scale may be utilized to generate a log normal distribution of data metric values. Other scaling functions may alternatively be utilized to scale the data metric values in a manner that operates for the baseline risk process.

At step 514, a regression analysis may be performed on the scaled data metric values to estimate relationships among the data metric $506_{1,1}$ for the risk factor $504a$. In one embodiment, the regression analysis may utilize a sigmoid function based logistic regression to derive an "S" curve cumulative distribution from the scaled data metric values, normalized between 0 and 100. In another embodiment, a linear regression analysis may be used if the underlying data is made up of ordinal values. As shown, steps 508-516 are performed for each of the data metrics 506 collected from the data sources. Once all the data for an individual risk factor has been transformed using the sigmoid function based logistic regression or the linear regression, at step 510, missing data metric values may be imputed using such methods as possibly K nearest neighbors prediction processing, for example. Other transformation functions may be utilized for transforming data for an individual risk factor.

At step 518a-518n, the scaled, regressed, and normalized data metric values may be aggregated to calculate a score for the associated risk factors. In one embodiment, an aggregation value may be between 0 and 100. At step 520, a weighting may be applied based on the impact value of the risk factor or other metric. The weighted aggregate generated at step 520 may be a baseline geographic region risk score 522 with a range of 0-100, for example. Because the data metrics 506 received from the data sources may be updated on a relatively slow basis (e.g., quarterly, semi-annually, annually) and on different schedules for different geographic regions, updating the baseline risk score for the geographic regions may be updated on a periodic (e.g., an annual basis or other relatively slow timeframe) or aperiodic (e.g., in response to a significant economic or political event) basis.

Risk Sensing Signal Processing

Figure 6A:
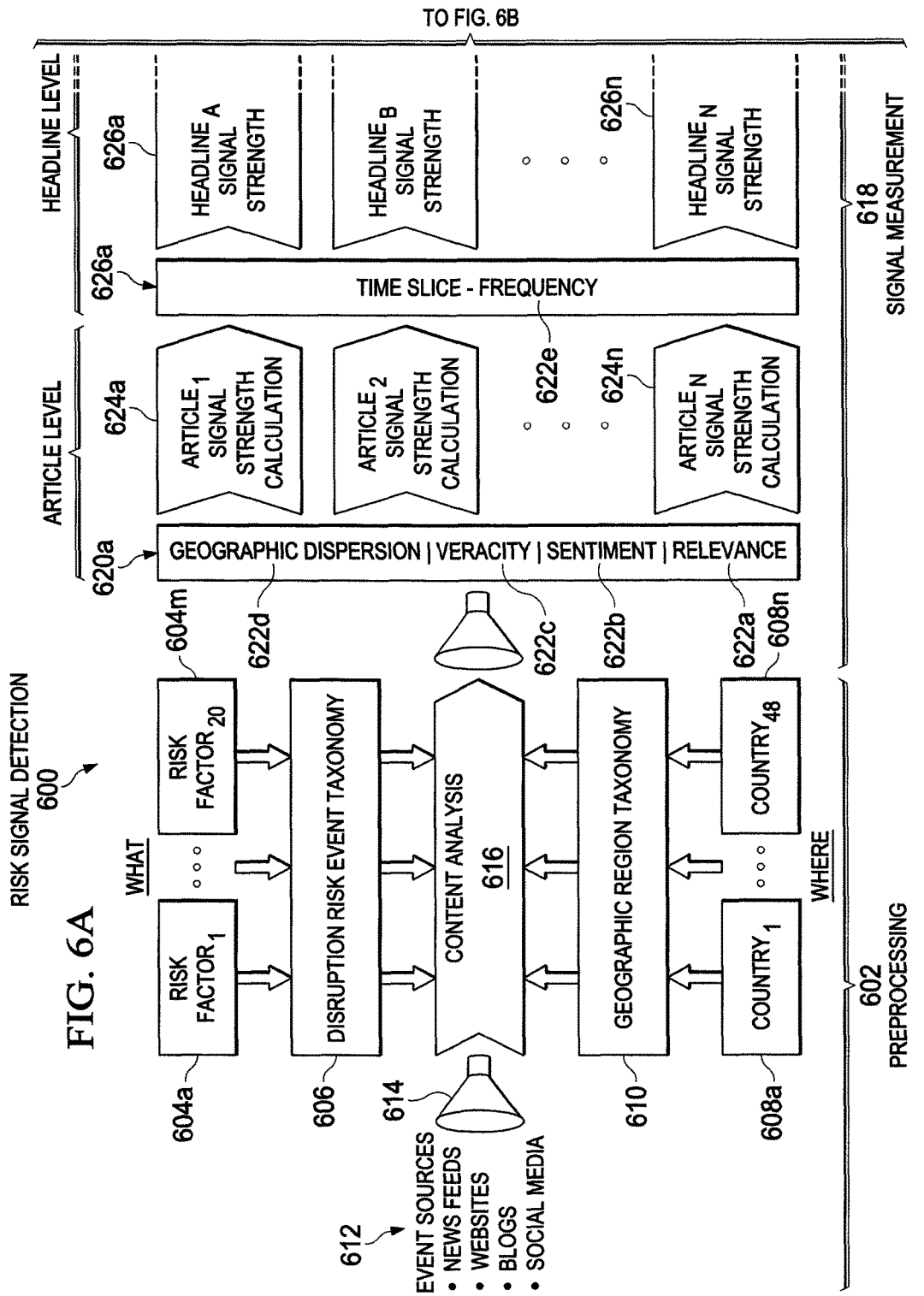
FIGS. 6A-6B (collectively FIG. 6) is a flow diagram of an illustrative process for performing risk signal detection within a geographic region.
Figure 6B:
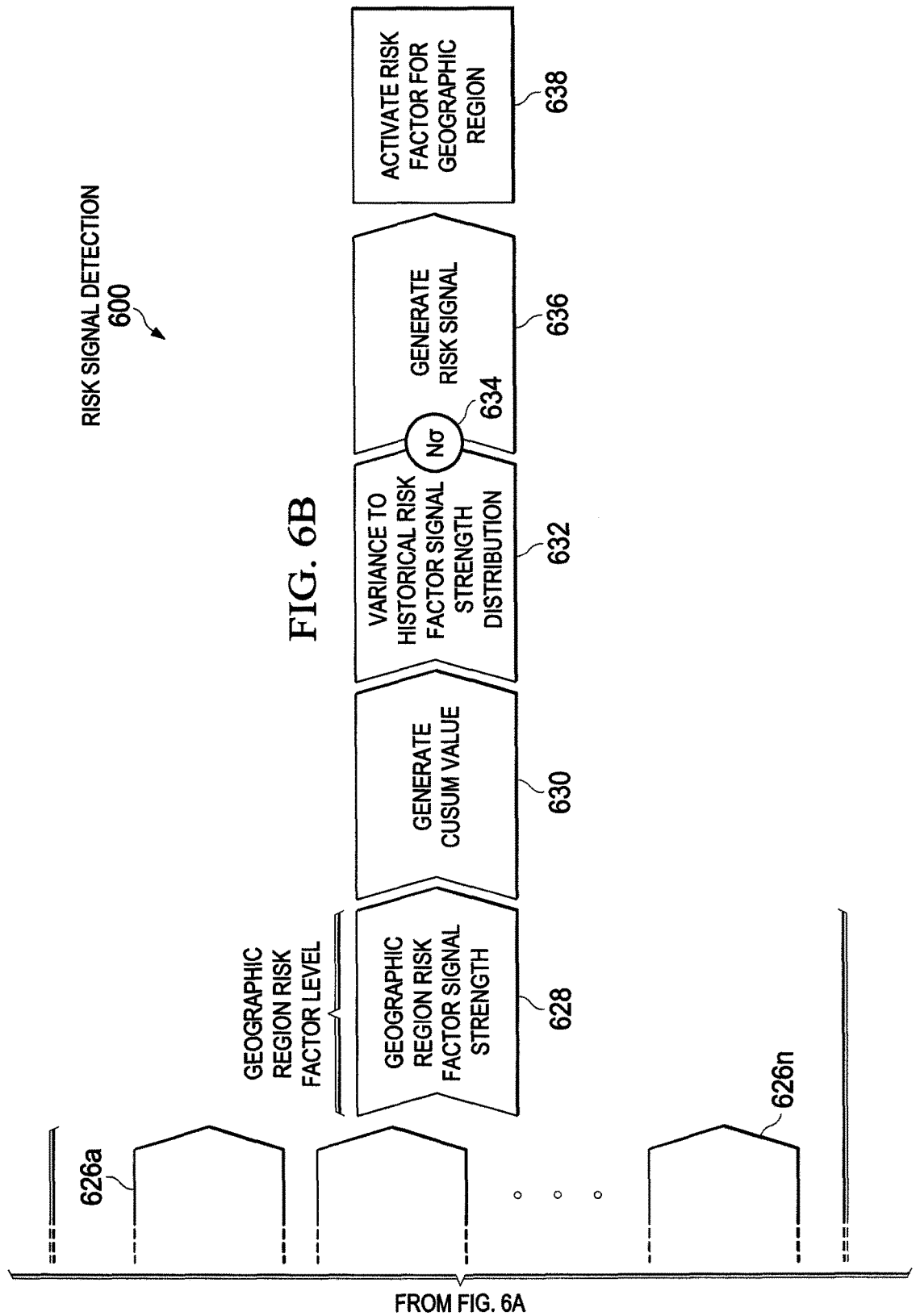

With regard to FIG. 6, a flow diagram of an illustrative process 600 for performing risk signal detection within a geographic region using the network map of FIGS. 2A and 2B is shown. Risk signal detection is generally derived from news sources that apply to risk factors within a geographic region. Proprietary taxonomy at the risk factor level within a specific geographic location is applied to the content from millions of such sources including, for example, news organizations and feeds therefrom, websites, government publications, blogs, social media, etc. Various heuristic measures which may include relevance, sentiment, veracity of a source and geographic dispersion are used to determine the signal strength of each relevant article. These heuristic measures are calculated on a normalized scale using standard univariate regression techniques. Relevant articles may be clustered into a headline—a corpus signifying a disruption risk event within the geographic region. Signal strength for a specific risk factor within a geographic region is calculated continuously through a configured time slice. This time based signal strength for a risk factor may then be compared to historical distribution of the time based signal strength for the prior year and signal detection is performed using a modified CUSUM algorithm. A detected signal for a risk factor in a geographic region may then be subjected to validation.

In performing the process 600, a preprocessing stage may include establishing risk factors 604a-604m (collectively 604), and disruption risk event taxonomy 606 along with geographic regions 608a-608n (collectively 608), such as 48 countries, and geographic regions taxonomy 610. The risk taxonomy uses words and phrases that describe risk events for each of the risk factors. As an example, such risk taxonomy may include words and phrases associated with each risk factor, such as "bridge collapse," "port closure," and so forth for the transportation infrastructure risk factor. As shown, content from event sources 612 may include millions of sources, such as news organizations and feeds therefrom, websites, blogs, social media, or any other content from data sources that are available via a computer network or otherwise. This content may be "pulled" at aperiodic or periodic intervals which are configurable. Articles and content being searched may be in any language. The event sources 612 may be accessed via one or more data aggregation systems 614, such as news aggregation systems, as understood in the art. The data aggregation systems 614 may be configured to utilize the disruption risk event taxonomy 606 and geographic region taxonomy 610 to perform a content analysis process 616 in near real-time or as available (i.e., when content is available via a data source). The content analysis process 616 operates to filter the content (e.g., news stories) from the event sources 612 such that content that complies with the taxonomies 606 and 610 are considered and content that does not comply with the taxonomies 606 and 610 are not considered by the process 600. In other words, events or stories not identified by the taxonomy are not considered because those events or stories are not determined to be related to risk factors.

The output of the pre-processing 602 may be sets of content as different filters associated with risk factors and geographic regions. As an example, if there are 20 risk factors and 48 countries, then 960 filters ("buckets") into which the content is organized or filtered resulting from the taxonomies 606 and 610 and content analysis process 616 would result. The content may have associated metadata, such as source, origin, date, time, author, and so forth that may be used in performing a risk signal detection to separate a signal from the noise. In one embodiment, metadata may be determined from and associated with the content for further processing. The filtered content may thereafter be processed by a signal measurement process 618.

The signal measurement process 618 may be used to produce signal strength of content being measured. Measurements or computations may be performed at steps 620a and 620b, where the measurements may include measuring (i) relevance 622a, (ii) sentiment 622b, (iii) veracity or strength of source 622c, and (iv) geographic dispersion 622d to produce article signal strengths 624a for each set of content (e.g., news article). The normalized values of these measures for each article processed for a specific filter (a risk factor within a specific geographic region) are averaged to compute the signal strength of the article and then aggregated across all articles within a headline 620b to calculate the signal strength at a headline level 626a-n. In particular, the relevance measurement 622a may be a measurement score as to how relevant content is to a risk factor (e.g., transportation infrastructure). As understood in the art, relevance may be measured based on whether the taxonomy is appropriately applied to the content, such as a news article, and if such content is in fact reflective of a risk factor. A configurable threshold is used to exclude articles with low relevance scores.

The sentiment measurement 622b may be measured by identifying words or phrases within content, and a sentiment score may be produced, as understood in the art. In one embodiment, the sentiment score may be produced by a content aggregation system, and may use a taxonomy model or otherwise. A configurable threshold may be used to exclude articles with high sentiment scores.

The veracity measurement 622c may be used to determine how credible or reliable the source of the content is. For example, an article that is published by a conventional news source with historically known high level of credibility (e.g., a highly regarded, international newspaper from New York or London) may be considered more credible than another lesser known, conventional news source with a weaker track record. In one embodiment, to determine news source and domicile, especially for lesser known news sources, various online source identification tools may be utilized. Moreover, a conventional news source may be given more credibility than a new media news source, such as a blog. In one embodiment, the higher the credibility, the higher the veracity score may be assigned.

Using geolocation codes, the geographic dispersion measurement 622d may be used to determine the distance between location of a risk event and the location of the reporting source. Based on the geographic origination, certain weight may be applied. In one example, a higher score, may be given to an article if the reporting source was farther away from the event location, compared to only a local news reporting source.

The frequency measurement 622e refers to how signal strength at an article level is in fact translated to signal strength at a headline level and at a risk factor level. The values of the other four heuristics are averaged to derive signal strength at an article level. These signal strengths of articles captured within the fixed time period may then be aggregated to derive the signal strength at a headline level, and then at the risk factor level. This risk factor signal strength 628 may be normalized to a score between 0 and 1 using standard regression techniques. Based on the intervening frequency periods since the previous signal strength calculation for the risk factor, the normalized signal strength per frequency period value is calculated for the risk factor. This fixed-frequency, amplitude-modulated signal strength is used for signal processing subsequently.

The fixed-frequency, amplitude-modulated signal strength is used for step detection of the time series of observed signal strengths for a specific risk factor within a geographic region by using a modified CUSUM algorithm at step 630. At step 630, the CUSUM value for a specific risk factor signal strength measurement is calculated sequentially using the running mean of the signal strength for the full time series of signal strengths measured for that risk factor within the geographic region. The variance of the historical distribution of the fixed-frequency, amplitude-modulated signal strength values for that risk factor in that geographic region is used to establish two configurable parameters: 1) a slack factor or likelihood function and 2) a signal detection threshold. The variance of the historical distribution of the signal strengths provides for a sequential analysis. In both cases, the configuration values are expressed in terms of the number of multiples of variance. In the event of the CUSUM value exceeding the signal detection threshold, then at step 636, a risk signal may be generated after a period of monitoring. At step 638, a risk factor for a geographic region may be activated.

By using the variance of the historical distribution of a signal strength of a risk factor for the geographic region, the system avoids generating alerts when risks are within a normal range in the particular geographic region. As an example, if ten news stories related to corruption within a country in southeast Asia, for example, occurs within a single day, that may be considered to be with normal risk levels, whereas if four news stories related to corruption occurs in a Scandinavian country, then that may be determined to be significant and outside a normal risk level when compared to the historical experience. The use of the historical distribution based risk signal processing allows the system to assist a manufacturer in detecting anomalies in risk levels, thereby helping to avoid disruption in a supply chain in any geographic region in which suppliers for the manufacturer operate or receive goods or services to include in supply materials or components. It is understood that the risk signal processing may be applicable to other third parties. The system and processes described herein provides for third party intelligence, and may be extended to be used for operational intelligence and/or other uses.

Figure 7:
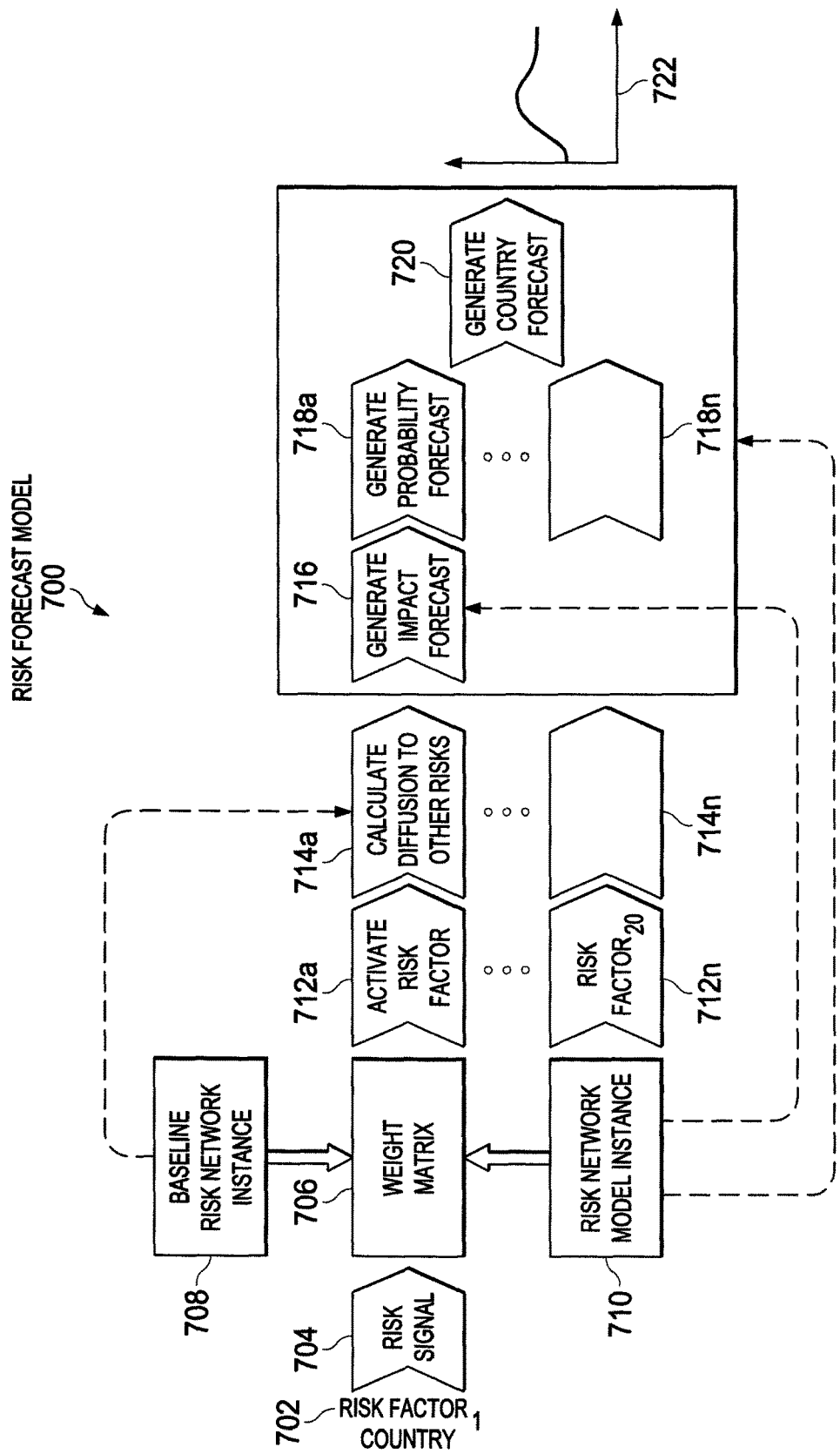
FIG. 7 is a flow diagram of an illustrative process for generating a risk projection within a geographic region based on risk signal detections as performed by the process of FIG. 6 and the network map of FIGS. 2A and 2B.

With regard to FIG. 7, a flow diagram of an illustrative process for generating a risk forecast within a geographic region based on risk signal detections as performed by the process of FIG. 6 and the network map of FIGS. 2A and 2B is shown. The risk projection model projects the impact and probability of risks into the future based in part on the risk model defined by a network map, using such inputs as impact, probability, and velocity. In response to a risk factor 702 for a geographic region being activated at step 638 of FIG. 6, a risk signal 704 may be processed. The risk signal may be applied to the risk network instance 710 for the particular geographic region. The risk network instance for a particular geographic region reflects its baseline risk network instance 708 (i.e., the baseline risk network for the geographic region) and all active risks presently impacting and propagating through that network 710.

At step 712a, a risk factor for the geographic region may be activated if the CUSUM value for that risk factor exceeds a configurable threshold value that is based on the variance of the historical distribution of the signal strength values for that risk factor in that geographic region. Upon activating a risk factor for the geographic region, at step 714a, the impact of that risk may be diffused out to other risk factors in the risk network map instance for that risk factor in the geographic region using the Leontief Input Output Model. In calculating diffusion, the use of the model inputs 210 of FIG. 2 that are embodied in the network map 202 of the risk network model of FIG. 2 may be utilized by determining interconnectedness between nodes representative of risk factors. Using the Leontief inverse matrix, diffusion of the impact of an activated risk factor may be calculated throughout a risk network instance such that the network is fully balanced. In one embodiment, a "shock" may be applied to the risk network instance in a geographic region as a risk factor is activated, which causes an increase in risk across the rest of the nodes based on the baseline risk values for each risk factor and the connection topology of that risk network instance. At step 716, the impact projection due to a risk factor is generated; this adds an incremental amount of risk to the existing baseline impact values of each risk factor over a period of time determined by the velocity characteristic of that risk factor. The projections are generated for a duration until the incremental risk impact applied to the network instance is fully dissipated 210. Due to the diffusion of the risk impact within the network, the impact values and velocities for all risk factors may increase. At steps 718a-718n (collectively 718), a probability projection may be generated for each of the risk factors in the network map instance based on the likelihood of each risk factor reaching its maximum or peak value. The model also handles the cumulative effect of multiple risks activating simultaneously or separately.

At step 720, a risk forecast of a geographic region may be generated by aggregating the impact projections for all risk factors, driven by the activation of risk factors for that region resulting from events as determined by the risk signal detection process 600 of FIG. 6. Once the impact projection is aggregated and velocity assessed, then a score is generated for that geographic region. A graph or other report 722 may be presented to a risk manager or other user. Although shown as a line graph of a forecasted risk of a geographic region, it should be understood that forecasted risk of individual risk factors may also be shown on one or more reports in any format desired (e.g., line graphs).

Figure 8:
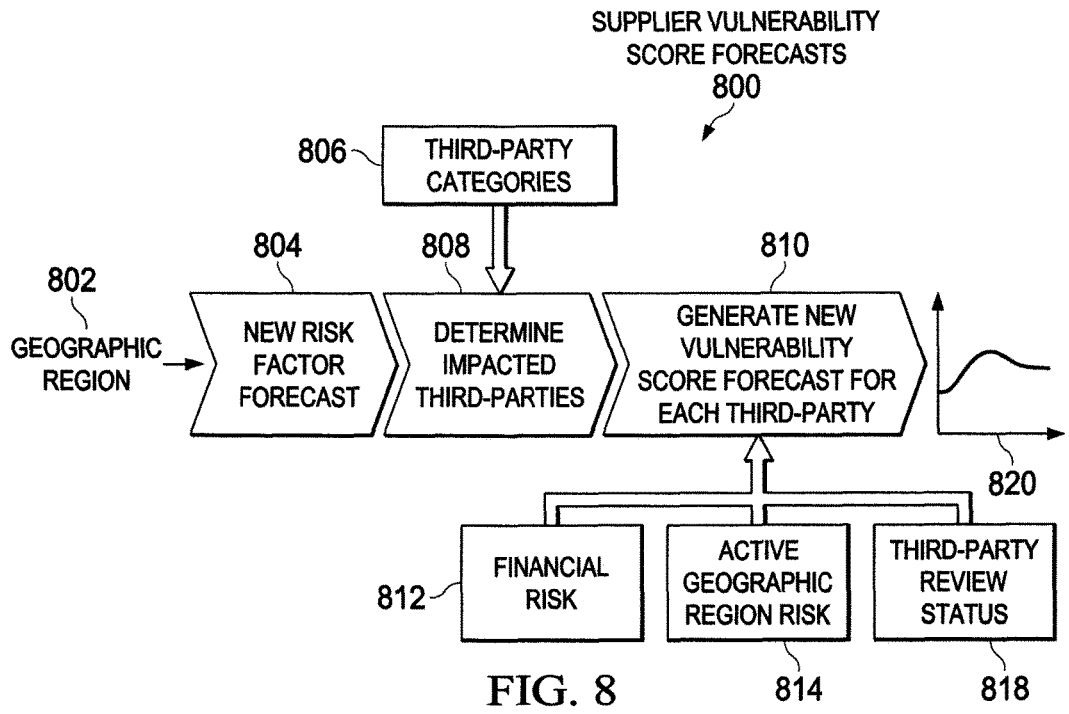
FIG. 8 is a flow diagram of an illustrative process for generating a vulnerability score projection for a third party in a geographic region.

With regard to FIG. 8, a flow diagram of an illustrative process 800 for generating a variety of vulnerability score forecasts for third parties of a supply chain in geographic regions is shown. The process 800 may be used when a risk analyst or other user is operating a user interface, such as that shown in FIGS. 9A-9F. The process 800 may start at step 802, where a user may look at a geographic region 802. At step 804, a new risk factor projection may be made. The risk factor projection may be generated by or selected from a network map used to generate a dynamic risk model as risk signals are detected. At step 808, impacted third parties in the selected geographic region may be determined taking into account the type of business the third party operates as different categories of industry are more affected by and have greater sensitivity to different groups of risks. The industry category of the supplier or other third party may determine the degree of sensitivity that third party may have to a risk factor.

A vulnerability score is calculated for each third party at step 810 based on its financial risk score 812, active, impacting geo political risk(s) scores 814, and its review aging score 818. Each of these scores 812, 814, and 818 may be normalized to a scale between 0-100. Each component of the vulnerability score may be weighted differently, and the vulnerability score is a simple weighted average of the individual component scores. For example, the weights applied in step 810 may include applying a certain weight to the financial risk 812, the same or different weight to the geographic risk 814, and the same or different weight to a review status, and a moving average component. The financial risk 812 may be updated on a quarterly basis or otherwise, and the geographic risk may be updated on a real-time or up-to-date basis. A graph or other report 820 may be presented to a risk manager or other user. It should be understood that the above weights and updates are illustrative and that alternative weights and updates may be utilized. The vulnerability score may be a projection for a third party as it is a function of the risk projections for the active risk factors that exists within that geographic region.

With regard to FIGS. 9A-9F, screenshots of a set of illustrative dashboards 900a-900f (collectively 900) that provide for reports of assessments of third parties operating in different geographic regions for a user are shown. The dashboard 900a includes a world map 902 with highlighted geographic regions 904a-904n (collectively 904), in this case countries, that are highlighted. The highlighting of the geographic regions 904 may be due to having high projected risk levels for the third parties in that jurisdiction due to the geopolitical macro environment or due to the third parties themselves. The geographic regions are highlighted according to the average vulnerability score for the third parties in that region exceeding a threshold value which is configurable. A set of selectable parameters 906a-906e (collectively 906), including "reviews needed" parameter 906a, "products" parameter 906b, "business units" parameter 906c, "supplier categories" parameter 906d, and "countries" parameter 906e may enable a user to have flexibility in viewing risk data generated from, in part, content and metadata in determining projected risk for third parties. As indicated, there are 29 reviews needed reflecting third parties with vulnerability scores exceeding warning level thresholds and requiring reviews. In this example, there are 6 vulnerable products of the user reflecting the average vulnerability score of third parties associated with 6 products exceeding a threshold value; 7 vulnerable business units of the user, 12 supplier categories, and 6 countries in which suppliers are operating. A set of selectable risk projection timeframes 908 may enable presentment of a timeframe over which the user desires to view projected risks and vulnerability scores. As shown, the selectable risk projection timeframes 908 include today, +4 weeks, +12 weeks, and +16 weeks. It should be understood that additional and/or alternative projection timeframes may be utilized.

Figure 9A:
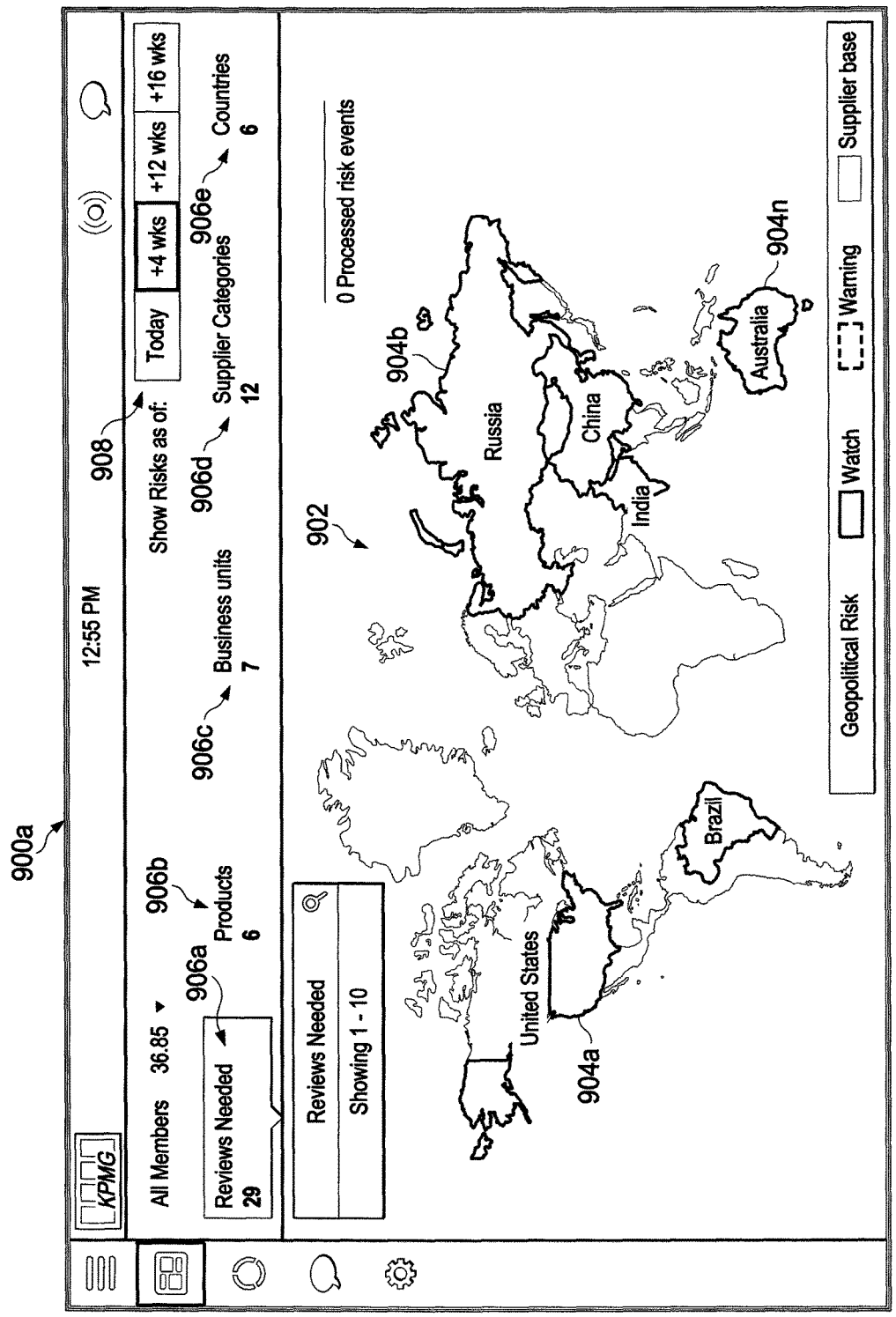
FIGS. 9A-9F are screenshots of a set of illustrative dashboards and reports that provide for reports of forecasts of third parties operating in different geographic regions for a user.
Figure 9B:
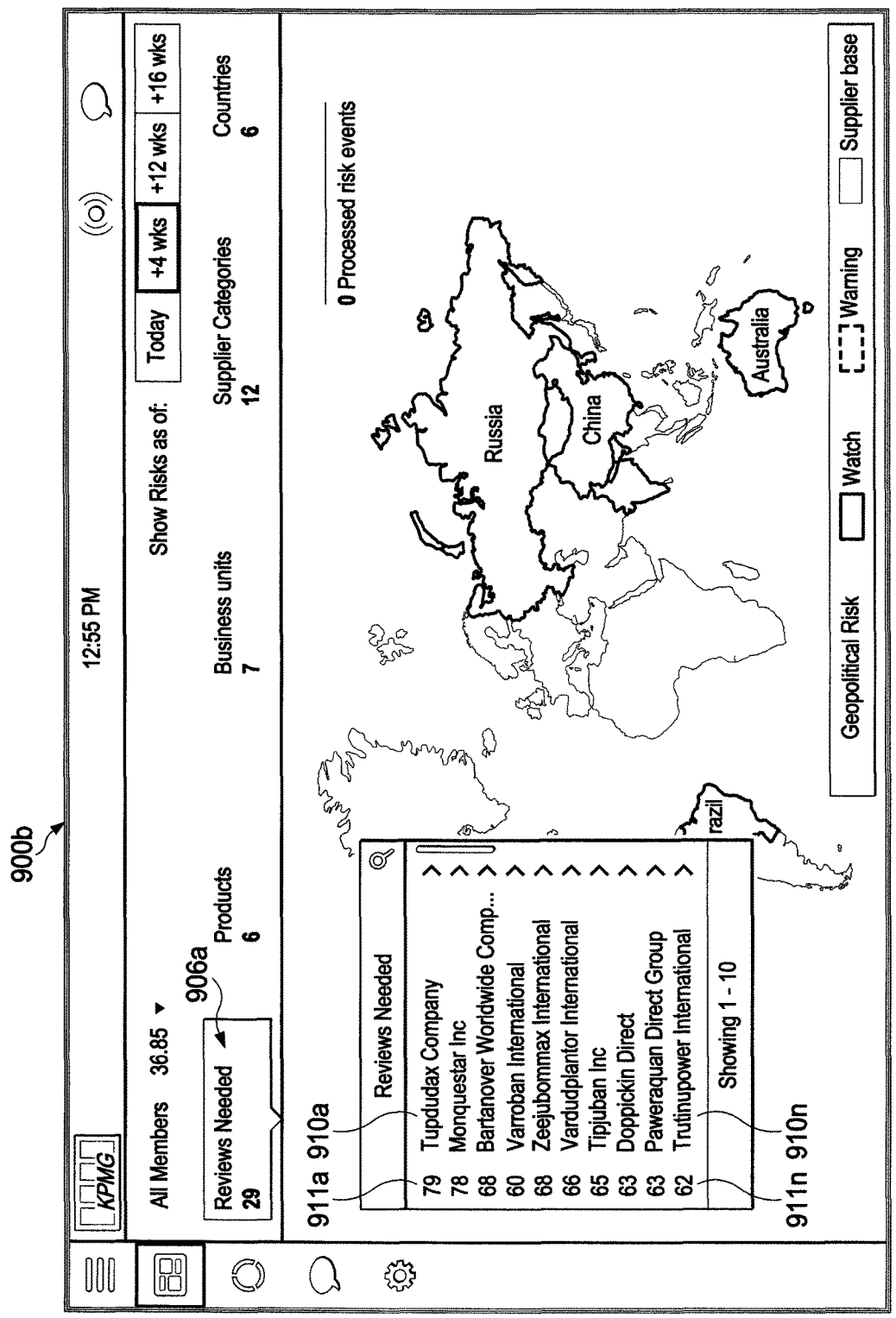

As shown in FIG. 9B, in response to a user selecting the "reviews needed" parameter 906a, a list of third parties 910a-910n (collectively 910) may be displayed. The list of third parties 910 are those third parties needing a review in descending order of vulnerability score 911a-911n that exceed a warning level threshold value as determined by the models of FIGS. 7 and 8. The geographic regions in which the third parties are operating may be highlighted as shown or otherwise reflecting the footprint of the third party portfolio where the average vulnerability score projection exceeds a user-configurable watch threshold.

Figure 9C:
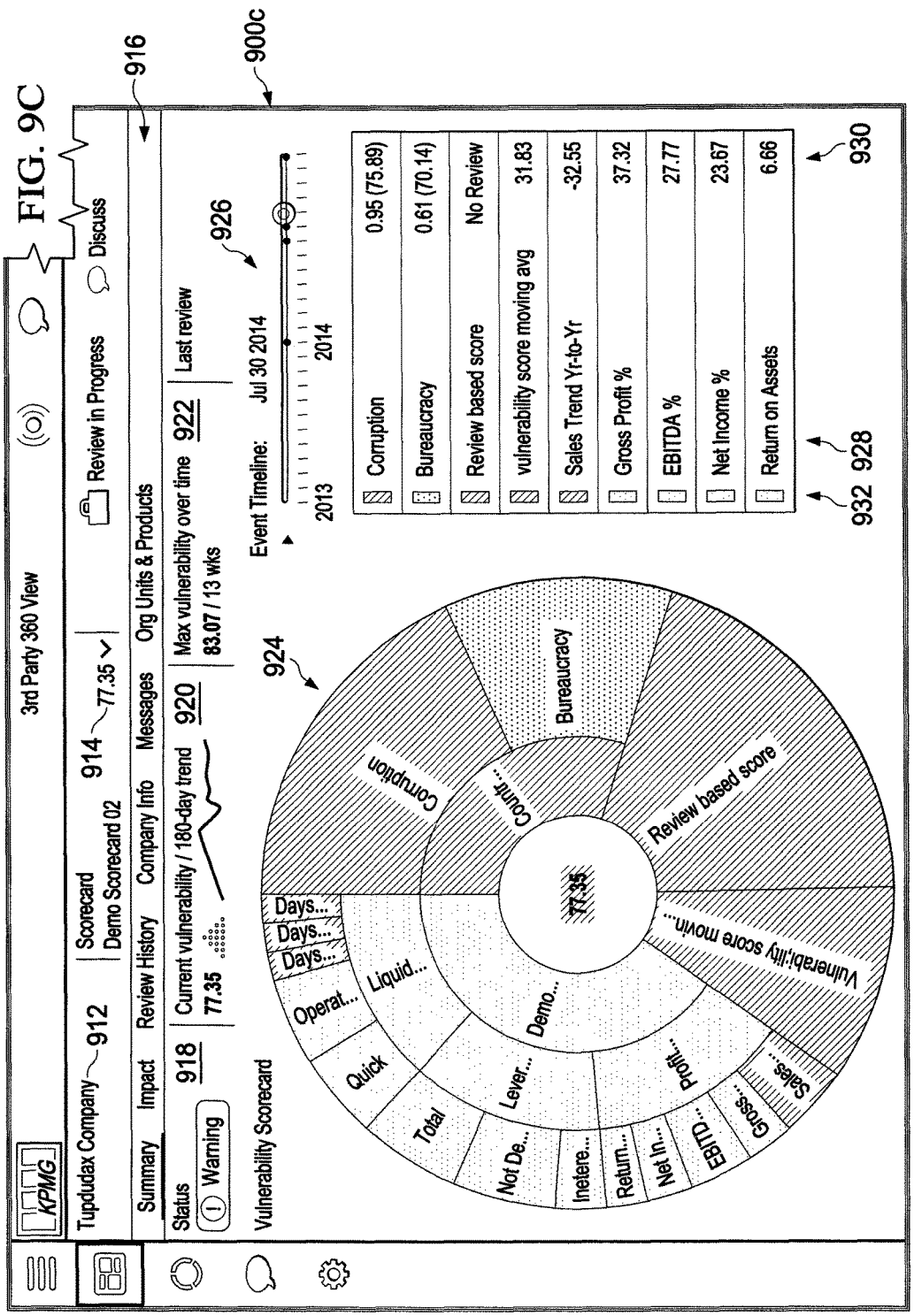

As shown in FIG. 9C, the user interface 900c is shown to list a name 912 of a selected third party 910a selected from the list presented in FIG. 9B. An illustrative vulnerability scorecard 914 may be listed providing a user with a single value indicative of overall vulnerability due to risk assessment. A list 916 of selectable viewing options for the company is shown to include "Summary," "Impact," "Review History," "Company Info," "Messages," "Org Units & Products." The "Summary" viewing option is selected, and summary information about the selected company (user) is shown.

The user interface 900c is further shown to include a status 918, in this case a warning indicator is shown, current vulnerability and a 180-day trend 920 is shown with a 77.35 vulnerability score. A maximum vulnerability score over time 922 is shown with an 83.07 in 13 weeks is shown. A segment chart showing the vulnerability along with the risk factors that are active in that geographic region of the third party as well as the inactive risk factors. Financial metrics of the discrete supplier or third party are also shown. An event timeline that allows for "playing" vulnerability scores in a dynamic manner over time (e.g., 2 years) is provided. A list of different summary parameters and metrics 928 and actual values 930 may be provided along with indicators 932 shown in different colors (e.g., green, yellow, red) to provide an easy to spot indicator of high levels of risk. It should be understood that an operator may select any of the segments or summary parameters and metrics 928 to view more information associated with the selected element.

Figure 9D:
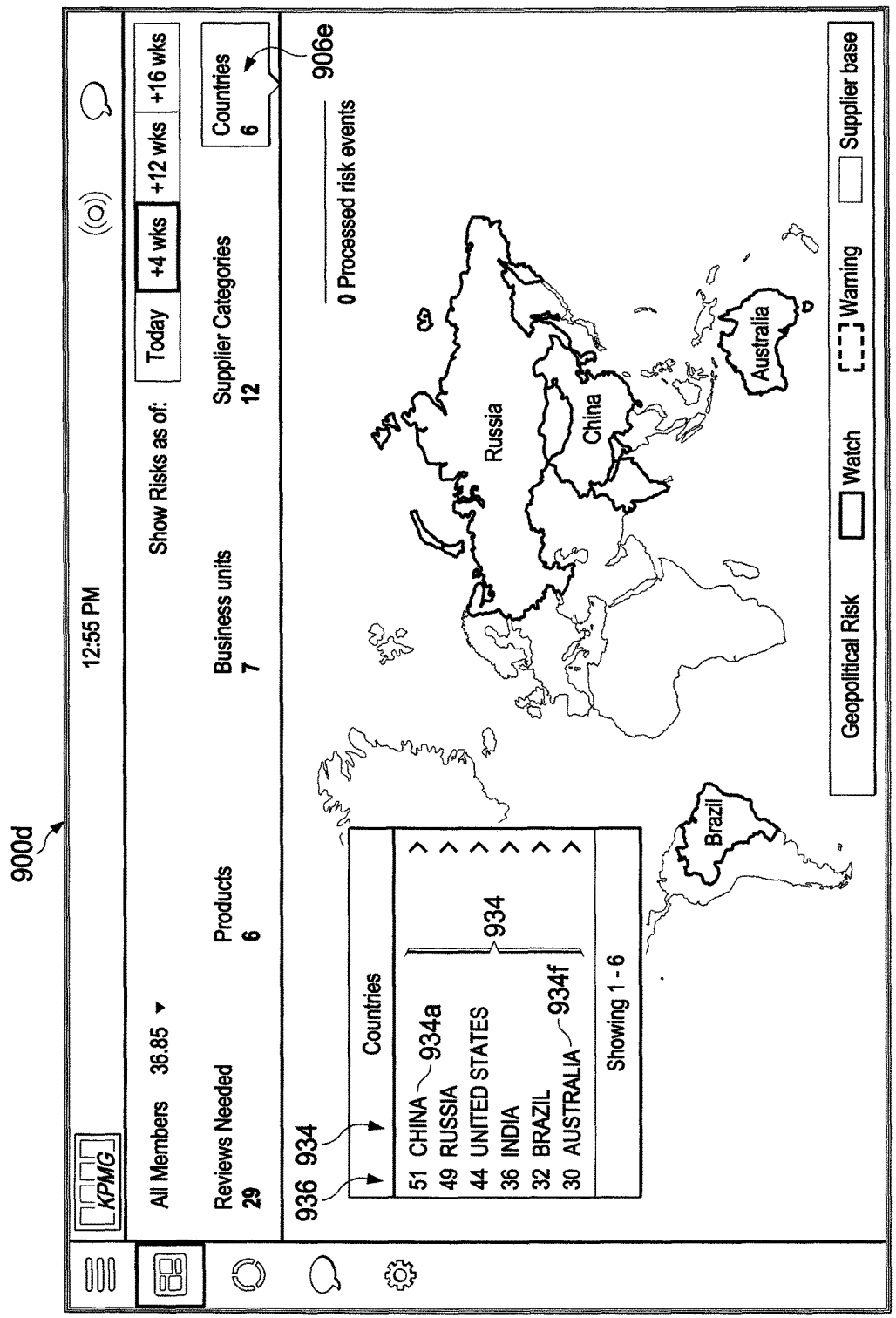

As shown in FIG. 9D, the user interface 900d displays a list of countries 934a-934f where a user has suppliers or other third parties and the average vulnerability score of those third parties exceed a certain threshold, either watch or warning level. It is understood that thresholds are configurable. This vulnerability score reflects either macro elements of the country (geopolitical/economic risk) or discrete elements of risk (financial) of a third party operating therein. The average vulnerability score for the third parties operating in each region 936 is shown to be associated with each of the countries 934a-934f. The list 934 is selectable such that an operator may select a country, such as China 934a, to see additional information about China and the third parties operating there, as provided in FIG. 9E.

Figure 9E:
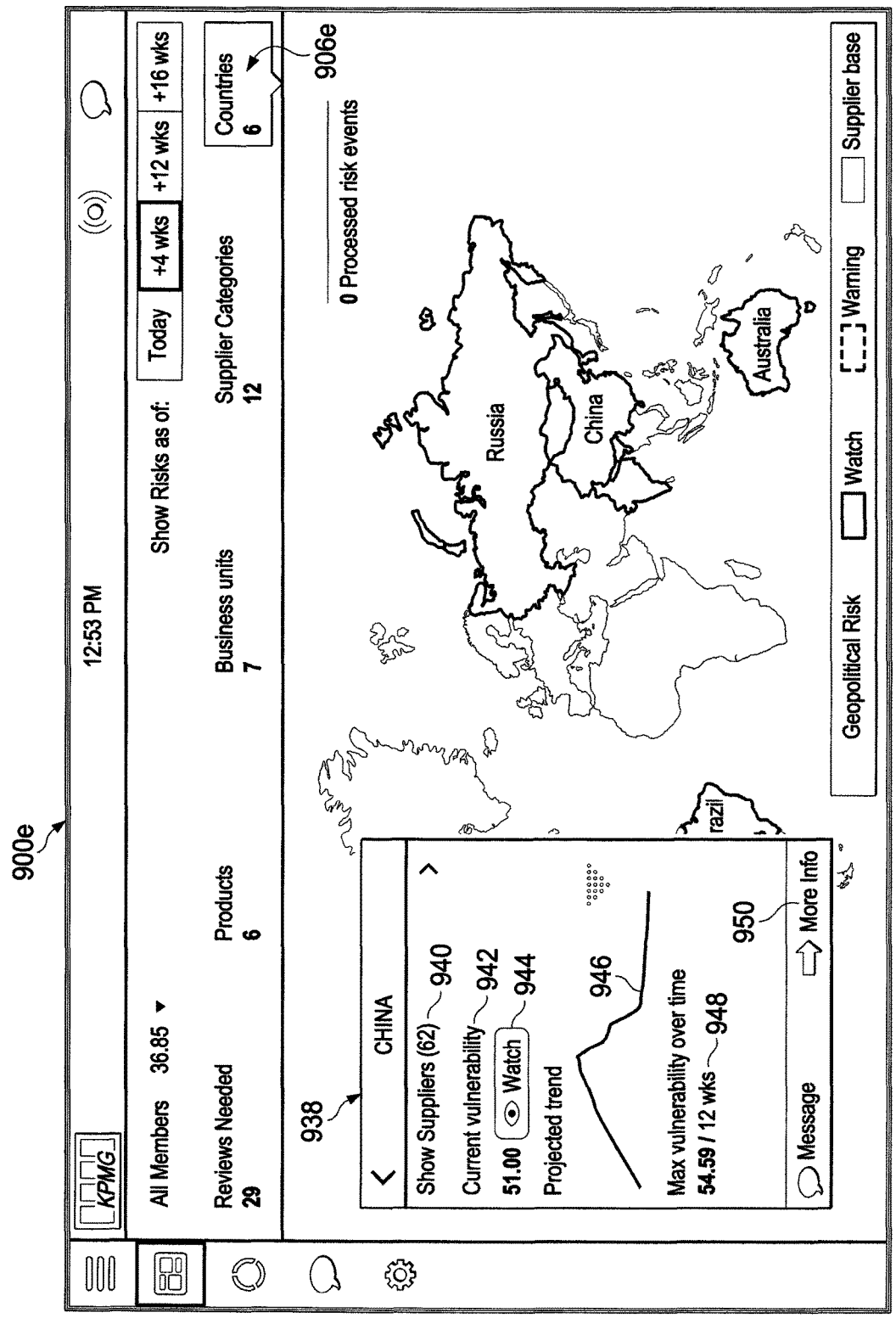

As shown in FIG. 9E, the user interface 900e provides for geographic region information 938, in this case the country of China, in response to an operator selecting the "countries"

parameter 906e and then "China" 934a within the list of countries 934 show in FIG. 9D. The geographic region information 938 may provide for a "Show Suppliers" option 940 that indicates the number of vulnerable suppliers of a user are operating in China as defined by the number of third parties with vulnerability scores greater than the watch threshold. Also shown is the average current vulnerability 942 of those suppliers in China. A "Watch" of "Warning" 944 may indicate that status. A "thumbnail" of a projected trend curve 946 may be shown. A maximum vulnerability over time score 948, in this case a maximum projected score of 54.59 over 12 weeks is provided to the operator. To the extent that the operator decides additional information is needed, a "More Info" soft-button 950 may be selected to view more information about the user's footprint in that geographic region 938.

Figure 9F:
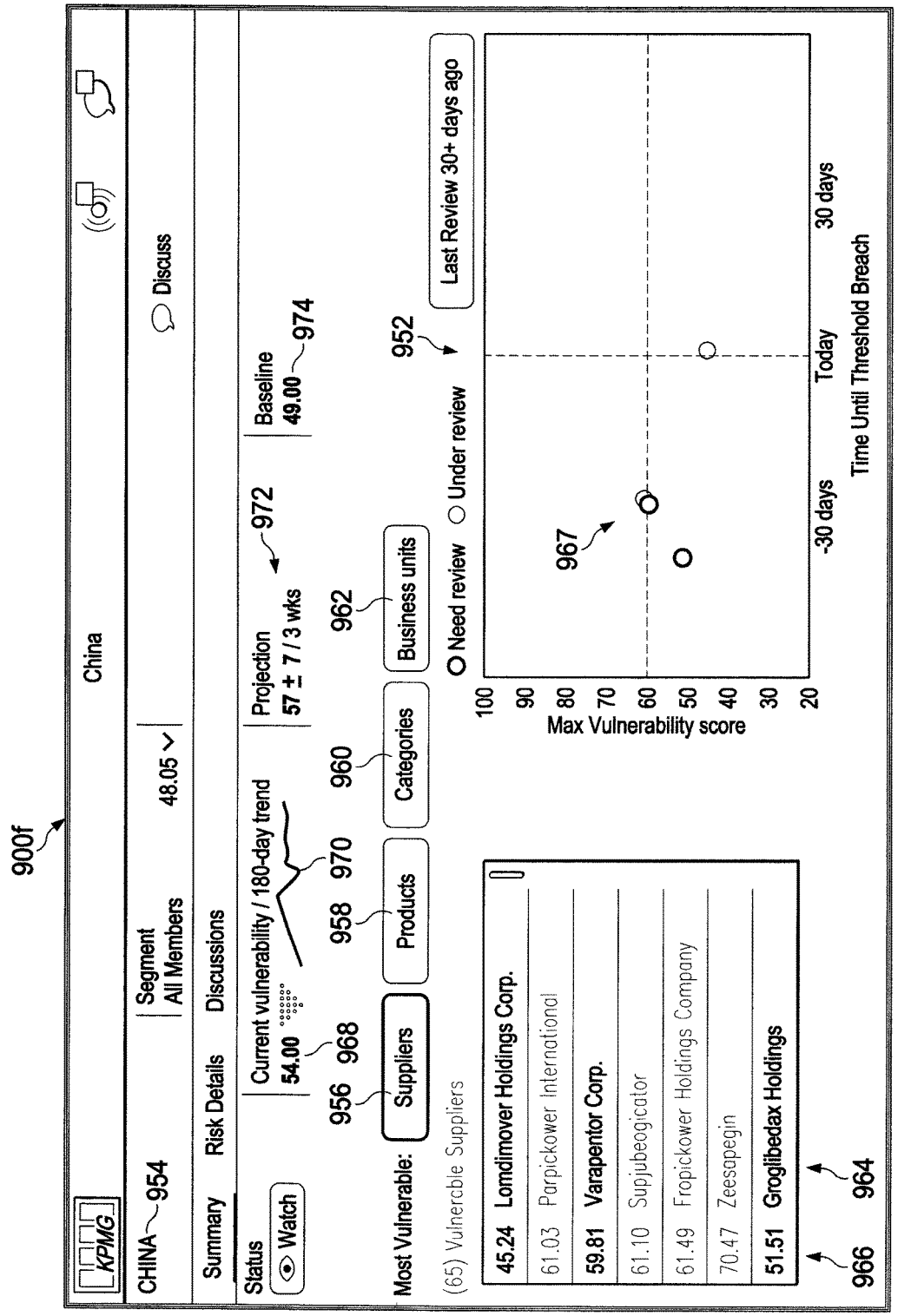

With regard to FIG. 9F, an illustration of an illustrative user interface 900f inclusive of a scatter plot 952 in which maximum vulnerability scores are plotted over time until threshold breach is shown. The user interface 900f allows for a user to select a geographic region 954 in which vulnerability scores may be assessed with regard to suppliers, products, categories, and business units, each being selectable via selectable corresponding graphical user elements 956, 958, 960, and 962. A list of "vulnerable suppliers" (third-parties) 964 along with corresponding vulnerability scores 966 may be listed, where the vulnerability scores 966 may be plotted as data points 967 in the scatter plot 952, as shown, or any other representation. In one embodiment, the data points 967 may be plotted in different colors and/or symbols depending on the vulnerability score value and immediacy of the time at which the vulnerability scores 966 exceed a vulnerability threshold value.

In one embodiment, an "actionability score" engine, executed by a processing unit, may be used to differentiate third-parties with similar vulnerability scores. For each third party in a client's network, the vulnerability score is a combination of a maximum projected vulnerability score and the date on which its vulnerability score breaches (or breached, if in the past) a threshold value established by the client. By providing for vulnerability score on a time-until-threshold-breach or time/date-dependent basis, clients may be provided with an automated priority for each of the suppliers, products, categories, and business units to enable a user to focus on suppliers or otherwise with the most immediate vulnerability issues. In one embodiment, the actionability score engine may include a sort system that sorts the vulnerability scores based on value and/or date on which the vulnerability scores are projected to cross a threshold indicative of becoming a problem for providing goods and/or services due to risk of one or more risk factors in the geographic region 954 being impacted by events occurring in the geographic region, as previously described.

As further shown, a current vulnerability score 968 is shown with vulnerability/180-day trend line 970. A projection and timeline 972 that shows a projection of the vulnerability score (e.g., 57+/−7) in a certain time period (e.g., 3 weeks) along with a baseline vulnerability score 974 in the geographic region may also be shown. Other information may also be provided to further assist a user with prioritizing risk and focus of suppliers.

Although the disclosure herein is focused for risk and vulnerability forecasts for third parties, it should be understood that alternative uses of the system and processes are possible. For example, the principles described herein may be applied to a variety of processes. Other uses are contemplated.

The previous detailed description of a small number of embodiments for implementing the invention is not intended to be limiting in scope. One of skill in this art will immediately envisage the methods and variations used to implement this invention in other areas than those described in detail. The following claims set forth a number of the embodiments of the invention disclosed with greater particularity.

We claim:

1. A computer-implemented method, comprising:
generating a computerized network map being inclusive of a plurality of nodes representative of risk factors in multiple geographic regions in which one or more third parties of a user operate, each of the nodes in the network map (i) being interconnected with at least one of the other nodes as correlated risks and (ii) including a risk factor value calculated as a function of at least one risk measure used to model the respective risk factor;
computing a baseline risk of a geographic region by:
  collecting data metrics for each risk factor of the geographic region;
  processing the data metrics to generate normalized data for each risk factor;
  aggregating the normalized data metrics of each risk factor to generate risk factor scores; and
  computing a baseline risk score for the geographic region by aggregating the risk factor scores;
dynamically performing signal processing for each risk factor in a geographic region on associated content, including news and event content, and metadata associated with the content by:
  utilizing a taxonomy describing disruption events associated with each of the risk factors of the network map and a taxonomy describing a geographic region being monitored in which the one or more third parties operate;
  measuring signal strength of the identified content based on the metadata associated with the content;
  measuring signal strength associated with a risk factor for the geographic region for a fixed period of time based on the signal strength of the identified content associated with that risk factor, thereby forming a time series of the measured signal strengths;
  performing sequential analysis on the time series of the measured signal strengths of the risk factor for the geographic region using the variance of the historical distribution of signal strength for the risk factor for step detection;
  step detecting to generate a risk signal for the risk factor within the geographic region based on a value of the calculated sequential analysis exceeding a threshold value determined by the variance of an historical distribution of the signal strength of the risk factor; and
  activating the risk factor for the geographic region in response to the risk signal being generated;
forecasting risk in the geographic region in which the risk factor was activated in response to the risk signal being generated, the forecasting including:
  calculating diffusion of risk throughout the network map so as to measure impact on correlated risks across the network map;
  computing the projection of risk impact for each risk factor within the network map;
  computing the probability projection for each risk factor within the network map; and generating a risk projection for the geographic region based on the individual risk factor projections; and generating a dynamic graphical user interface for the forecasted risk for the risk factors and the forecasted vulnerability scores for third parties within the geographic region.

2. The method according to claim 1, further comprising:
forecasting a vulnerability score for each third party operating in an industry affected by the active risk factor, the forecasting including:
categorizing third parties by industry and mapping the industries to the risk factors by degree of sensitivity;
determining a degree to which third parties are affected by the activation of the risk factor in response to the risk factor having been activated based on the industry categorization of the third party; and
calculating a vulnerability score projection for the affected third party based on a financial risk score of the third party, the active geographic risk factors of the region in which the third party operates based in part on the sensitivity of an industry of the third party to the active geographic risk as well as the review status/times since last review of the third party.

3. The method according to claim 1, wherein each of the nodes in a network map represents a risk factor that could potentially disrupt operations of the one or more third parties, and the impact, likelihood, and probability of each risk factor are modeled.

4. The method according to claim 1, wherein computing a baseline risk score includes:
removing outlier data values of the data metrics used to calculate the risk factors of each node before calculating the standard deviation and mean, and then reintroducing those outlier values;
scaling the data metric values;
performing a regression analysis of the metric data values; and
normalizing the data metric values.

5. The method according to claim 1, further comprising using a modified CUSUM to perform the sequential analysis of the time series of the measured signal strengths.

6. The method according to claim 5, further comprising:
determining that the modified CUSUM value of the risk factor exceeds a threshold value based on the variance of the historical distribution; and
generating a new risk event and associated projection for the geographic region, thereby increasing the risk score for the geographic region.

7. The method according to claim 6, further comprising, in response to determining that the risk score crosses a threshold value, causing a change to a graphical user interface to indicate that the risk score for the geographic region crossed the threshold value.

8. The method according to claim 1, wherein model inputs include impact, velocity, likelihood, and interconnectedness that are used to form the risk network model that the network map is configured to model.

9. The method according to claim 1, wherein dynamically performing signal processing includes performing the signal processing in near real-time over multiple geographic regions in which multiple third parties operate.

10. The method according to claim 1, wherein generating the computerized network map includes generating the computerized network map with multiple nodes representing risk factors.

11. The method according to claim 1, wherein generating the computerize network map includes generating the computerized network map across multiple geographic regions or within a single geographic region.

12. The method according to claim 1, wherein measuring signal strength of the identified content based on the metadata includes in part measuring signal strength of the identified content based on relative times that content is published.

13. The method according to claim 1, wherein measuring signal strength includes:
dynamically searching the content;
determining relevance and sentiment related to the risk factors from the content;
parsing the metadata associated with the content; and
determining geodispersion, source strength, and frequency of the content from the parsed metadata.

14. The method according to claim 1, wherein computing a baseline risk includes determining risk metric values based on information collected from external sources.

15. The method according to claim 1, wherein computing the baseline risk includes computing the baseline risk on a periodic or aperiodic basis.

16. The method according to claim 1, further comprising forecasting a vulnerability score.

17. The method according to claim 1, wherein calculating diffusion of risk of the network map includes using the Leontief Input-Output Model.

18. The method according to claim 1, further comprising calculating a normalized signal strength on a fixed frequency period, thereby producing a fixed-frequency, amplitude-modulated signal strength for use in performing the step detection.

19. The method according to claim 1, further comprising:
dynamically sorting multiple third parties based on vulnerability scores and projected dates at which the respective vulnerability scores are determined to cross a vulnerability threshold value; and
wherein generating the dynamic graphical user interface includes generating the forecasted vulnerability scores for the third parties in a date dependent manner to enable a user to determine which of the suppliers has the highest vulnerability over a projected date range within the geographic region by viewing the user interface.

* * * * *